(12) United States Patent
Kajiwara et al.

(10) Patent No.: US 6,626,101 B2
(45) Date of Patent: Sep. 30, 2003

(54) COLOR-IMAGE FORMING APPARATUS

(75) Inventors: Tadayuki Kajiwara, Fukuoka (JP); Junichi Tanizaki, Fukuoka (JP); Masaya Shimada, Fukuoka (JP)

(73) Assignee: Matsushita Electric Industrial Co., Ltd, Osaka (JP)

(*) Notice: Subject to any disclaimer, the term of this patent is extended or adjusted under 35 U.S.C. 154(b) by 52 days.

(21) Appl. No.: 09/950,061

(22) Filed: Sep. 12, 2001

(65) Prior Publication Data

US 2002/0043164 A1 Apr. 18, 2002

(30) Foreign Application Priority Data

Sep. 13, 2000 (JP) .................................... 2000-277786
Sep. 14, 2000 (JP) .................................... 2000-279686

(51) Int. Cl.[7] .............................................. B41F 17/10
(52) U.S. Cl. ........................ 101/171; 347/116; 399/301
(58) Field of Search ................... 101/171, 181; 399/301; 347/116

(56) References Cited

U.S. PATENT DOCUMENTS 5,579,092 A * 11/1996 Isobe et al. .................. 399/39
5,946,017 A * 8/1999 Carley ........................ 347/115
6,038,423 A * 3/2000 Tagawa et al. ............. 399/301
6,198,490 B1 * 3/2001 Eom et al. .................. 347/116
6,408,156 B1 * 6/2002 Miyazaki et al. ........... 399/301

FOREIGN PATENT DOCUMENTS

JP        10-260567        9/1998

* cited by examiner

Primary Examiner—Charles H. Nolan, Jr.
(74) Attorney, Agent, or Firm—Wenderoth, Lind & Ponack, L.L.P.

(57) ABSTRACT

A color-image forming apparatus minimizes displacement in toner images due to irregularities in the thickness of an inter-stage transfer belt. The pattern detector detects a registration reference pattern formed on the belt. Accepting information on displacement over one cycle of travel of the belt from the pattern detector, the displacement amount calculator detects information on displacement in a print range which the toner images formed in a plurality of image-forming stations are transferred thereto. The displacement amount calculator then calculates a mean value of displacement in the range. The central processing unit (CPU) controls the image-forming timing determined by a plurality of exposure units, according to the result calculated by the displacement amount calculator.

14 Claims, 38 Drawing Sheets

FIG. 16

| Color | NO | Count time of H sync. from belt home position | Position displacement |
|---|---|---|---|
| Y | 1 | $T_{1y}$ | $Z_{1y}$ |
| | 2 | $T_{2y}$ | $Z_{2y}$ |
| | | | |
| | n | $T_{ny}$ | $Z_{ny}$ |
| M | 1 | $T_{1m}$ | $Z_{1m}$ |
| | 2 | $T_{2m}$ | $Z_{2m}$ |
| | | | |
| | n | $T_{nm}$ | $Z_{nm}$ |
| C | 1 | $T_{1c}$ | $Z_{1c}$ |
| | 2 | $T_{2c}$ | $Z_{2c}$ |
| | | | |
| | n | $T_{nc}$ | $Z_{nc}$ |

FIG. 18

| Color | NO | Count time of H sync. from belt home position | Position displacement in K-C | |
|---|---|---|---|---|
| | 1 | $T_{1c}$ | $Z_{1y}$ | |
| | 2 | $T_{2c}$ | $Z_{2y}$ | |
| | 3 | $T_{3c}$ | $Z_{3y}$ | |
| | 4 | $T_{4c}$ | $Z_{4y}$ | Position apart from belt-home-position by Tx counts |
| | ⋮ | ⋮ | ⋮ | |
| | X | $T_{xc}$ | $Z_{xc}$ | ← Print start position on belt |
| | X+1 | $T_{(x+1)c}$ | $Z_{(x+1)c}$ | |
| C | X+2 | $T_{(x+2)c}$ | $Z_{(x+2)c}$ | |
| | ⋮ | ⋮ | ⋮ | |
| | X+K−2 | $T_{(x+K-2)c}$ | $Z_{(x+K-2)c}$ | |
| | X+K−1 | $T_{(x+K-1)c}$ | $Z_{(x+K-1)c}$ | |
| | X+K | $T_{(x+K)c}$ | $Z_{(x+K)c}$ | ← Print end position on belt |
| | X+K+1 | $T_{(x+K+1)c}$ | $Z_{(x+K+1)c}$ | |
| | X+K+2 | $T_{(x+K+2)c}$ | $Z_{(x+K+2)c}$ | |
| | ⋮ | ⋮ | ⋮ | |
| | n | $T_{nc}$ | $Z_{nc}$ | |

FIG. 31

| Color | NO | Position displacement |
|---|---|---|
| C | 1i | $Z_{1i(K-C)}$ |
| | 2i | $Z_{2i(K-C)}$ |
| | 3i | $Z_{3i(K-C)}$ |
| | 4i | $Z_{4i(K-C)}$ |
| | 1j | $Z_{1i(K-C)}$ |
| | 2j | $Z_{2i(K-C)}$ |
| | 3j | $Z_{3i(K-C)}$ |
| | 4j | $Z_{4i(K-C)}$ |
| M | 1i | $Z_{1i(K-M)}$ |
| | 2i | $Z_{2i(K-M)}$ |
| | 3i | $Z_{3i(K-M)}$ |
| | 4i | $Z_{4i(K-M)}$ |
| | 1j | $Z_{1j(K-M)}$ |
| | 2j | $Z_{2j(K-M)}$ |
| | 3j | $Z_{3j(K-M)}$ |
| | 4j | $Z_{4j(K-M)}$ |
| Y | 1i | $Z_{1i(K-Y)}$ |
| | 2i | $Z_{2i(K-Y)}$ |
| | 3i | $Z_{3i(K-Y)}$ |
| | 4i | $Z_{4i(K-Y)}$ |
| | 1j | $Z_{1j(K-Y)}$ |
| | 2j | $Z_{2j(K-Y)}$ |
| | 3j | $Z_{3j(K-Y)}$ |
| | 4j | $Z_{4j(K-Y)}$ |

FIG. 34  PRIOR ART
(a)
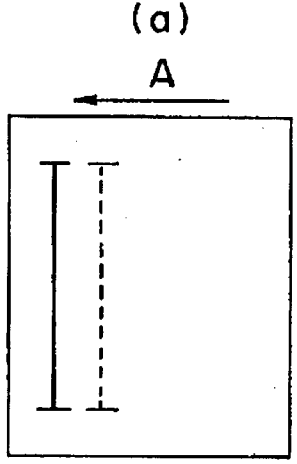
(b)
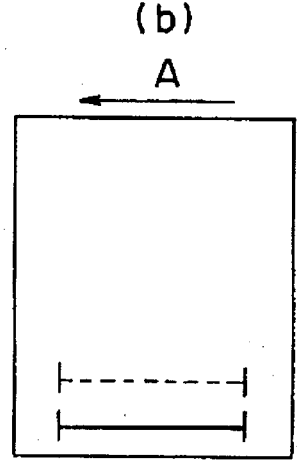
(c)
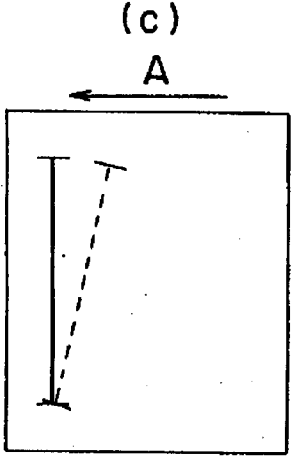
(d)
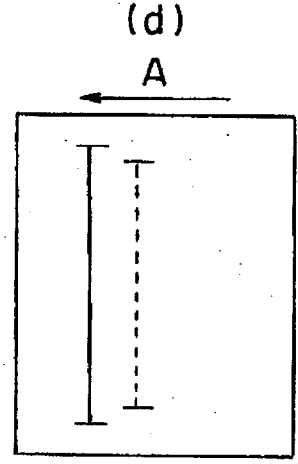
(e)
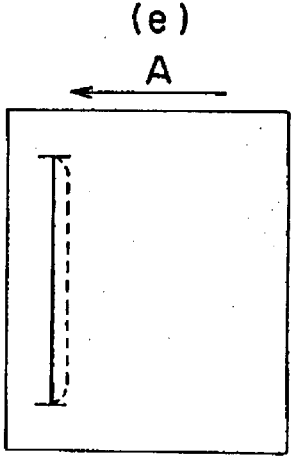

FIG. 37   PRIOR ART
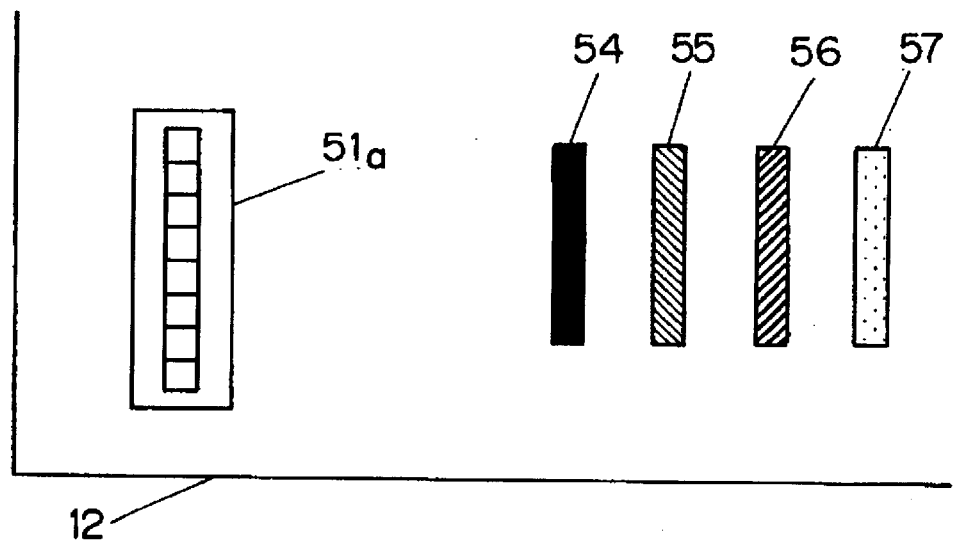
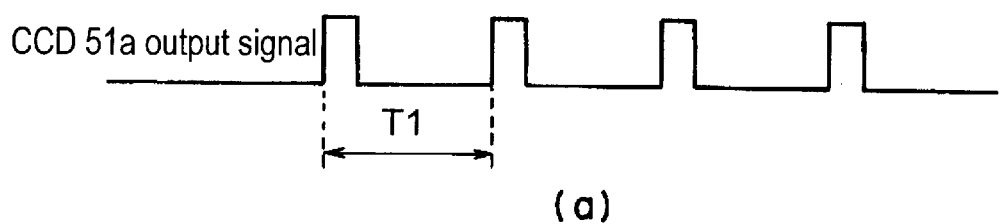
(a)
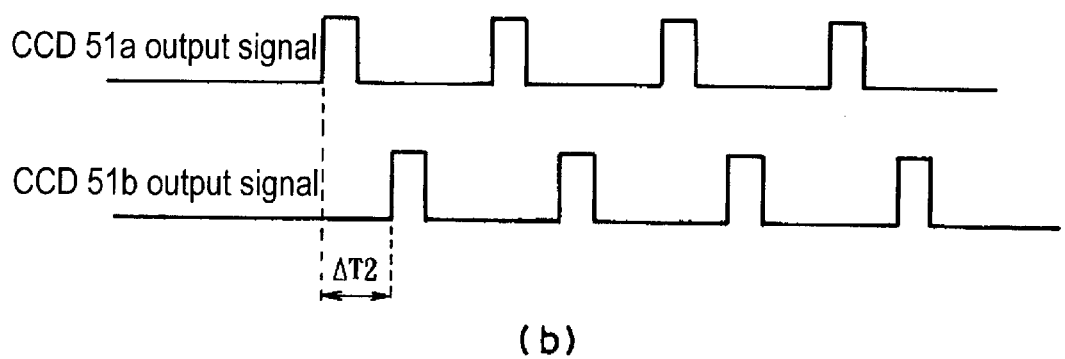
(b)

COLOR-IMAGE FORMING APPARATUS

FIELD OF THE INVENTION

The present invention relates to an electro-photographic color-image forming apparatus having a plurality of photosensitive bodies. More specifically, the invention relates to technology that detects positional displacements in each toner image formed on the photosensitive bodies carrying each color toner and transfers them with accurate positioning onto a recording material.

BACKGROUND OF THE INVENTION

In the prior-art color-image forming apparatus employing electro-photography, an image has been typically formed through the following procedures. First, a photosensitive body is charged as an image-carrier by a charger. Second, the charged body is provided with light radiation according to image information to form an electrostatic latent image thereon. Third, the electrostatic latent image is developed into a visible toner image by a developing unit. Fourth, the visualized toner image is transferred onto recording materials such as a sheet of paper.

Some kinds of apparatuses employing tandem type color-image forming have been developed to respond to the need for color images. A tandem-type color-image forming apparatus has a plurality of image-forming stations—a plurality of image-carriers. Each carrier is responsible for carrying cyan-, magenta-, yellow-, and preferably independent black-image. The four individual images are formed on the respective carriers in the series of image-forming process steps described above. All of the separately carried images are overlapped at a proper position of each carrier and transferred onto a sheet-type material to form a full-color image. Such a tandem type apparatus contributes to high-speed image forming due to the structural merit of having each image-forming section associated with each color. On the other hand, careful positioning (i.e., registration) of each image formed at different image-forming sections is indispensable for successful full-color image forming. Poor-registration of the four colors results in displacement in the whole picture or undesired gradations in color in transferring the image onto a sheet of paper or other materials.

FIGS. 34(a) through (e) illustrate typical displacements in transferred image. FIG. 34(a) shows displacement in the moving direction—shown by arrow A in the figure—of the transferred material (hereinafter referred to as displacement in secondary scanning). FIG. 34(b) shows displacement in the scanning direction—in a direction orthogonal to the direction indicated by arrow A—(hereinafter displacement in primary scanning). FIG. 34(c) shows displacement in a slanting direction (hereinafter called skew error). FIG. 34(d) shows scaling error, and FIG. 34(e) shows bend error. In a real world image-forming process, displacement is produced, with patterns FIGS. 34(a) through (e) complicatedly combined.

In the case of FIG. 34(a) above (displacement in secondary scanning), the displacement is mainly caused from inaccurate mounting of the image-forming stations or the scanning optical system, or inaccurate setting of the lenses and mirrors of the scanning optical system. This is also true in the case FIG. 34(b) (displacement in primary scanning).

The displacement described in FIG. 34(c) is caused from inaccurate angle-setting of the axis of rotation of a photosensitive drum in an image-forming station, or from inaccurate angle-setting of the scanning optical system. The displacement in FIG. 34(d) is mainly from inaccurate scanning length generated by the optical-path length from a scanning optical system to the corresponding photosensitive drum. The displacement in FIG. 34(e) is due mainly to inaccurate assembling of lenses in a scanning optical system.

In order to correct the displacement categorized in the five patterns, a suggestion has been made. The suggestion includes the steps of, (i) forming in advance a registration reference pattern (hereinafter referred to as a reference pattern); (ii) detecting positional displacement (displacement-detection) by a plurality of sensors; and (iii) performing the registration of each image (displacement-correction) according to the amount of displacement calculated from the result obtained in (ii).

Conventional reference-pattern detecting and displacement-correcting procedures will now be described.

FIG. 35 illustrates the structure of a prior-art reference pattern-detector (hereinafter pattern detector). FIG. 36 shows the layout of a reference-pattern formed on an inter-stage transfer belt and pattern detectors in the prior-art apparatus. FIGS. 37 and 38 illustrate the layout of a reference-pattern formed on an inter-stage transfer belt and pattern-detectors, and signals fed from the pattern detectors in the prior-art apparatus.

As shown in FIG. 35, pattern detector 14 contains an image sensor (hereinafter CCD) 51 and lens array 53 focusing light source 52 including a lamp, and reflected light onto CCD 51. This structured pattern detectors 14a and 14b are, as shown in FIG. 36, arranged so that a series of pixels in CCDs 51a and 51b are aligned in a line orthogonal to moving direction A of the inter-stage transfer belt (hereinafter simply referred to as belt) 12. Belt 12 has two CCDs, and each CCD is disposed close to a respective end of the belt in its widthwise direction with respect to the moving direction A of belt 12.

The reference pattern-detecting and displacement-correcting steps are performed based on a predetermined reference pattern formed of a line or figure pattern shown in FIG. 36. For example, the reference pattern can be formed of differently colored toner-images 54, 55, 56, and 57 at predetermined spaced intervals, and each toner image is disposed on a line orthogonal to the moving direction A of belt 12. Pattern detectors 14a and 14b detect positional displacement (i.e., registration displacement) based on an individual toner-image reference pattern.

In FIG. 37 (a), i) T1 represents the time required for each of the reference patterns 54, 55 56, and 57 to reach CCD 51a in the pattern detector, ii) T represents the time predetermined as a design value, and iii) v represents the moving speed of belt 12. Then, displacement in secondary scanning shown in FIG. 34(a) is obtained by calculating displacement in individual color through the following equations:

$$\Delta T1 = T - T1$$

$$\Delta Y1 = \Delta T1 \cdot v$$

In FIG. 38(a), when passing CCD 51a in the pattern detector, the scanning-start position of each of reference patterns 54, 55, 56, and 57 on belt 12 has a difference in pixel position (represented by (X1)). Displacement in primary scanning shown in FIG. 34(b) is obtained by calculating the displacement of the individual color based on the difference in pixel position.

Belt 12 has the same colored reference patterns 54, 55, 56, and 57 on both of its widthwise ends. A row of the reference pattern on one end passes CCD 51*a*, while the other row of the reference pattern in the other end passes CCD 51*b*. If the skew error (FIG. 34*c*) occurs, there should be a difference between the passing time of each reference pattern detected by CCDs 51*a* and 51*b*, as shown in FIG. 37(*b*). When the difference is represented by ΔT2 and the moving speed of belt 12 is represented by v, the skew error is obtained from the following equation: ΔY2=ΔT2·v.

If there is scaling error shown in FIG. 34(*d*), the scanning-start position and the scanning-end position of each of the reference patterns 54, 55, 56, and 57 on belt 12 have differences in pixel position when the two positions pass CCD 51*a* and CCD 51*b*, respectively. The differences are represented by ΔX2, ΔX1. The scaling error shown in FIG. 34(*c*) is obtained by calculation of the scaling error of each color based on ΔX1, ΔX2: ΔX3=ΔX2−ΔX1.

After the four calculations described above, displacement correction is performed according to the amount of displacement as follows.

In the case of displacements in primary- and secondary-scanning shown in FIGS. 34(*b*) and 34(*a*), respectively, the amount of displacement is corrected by controlling the scanning-timing of each color.

In the case of the skew error and the scaling error shown in FIGS. 34(*c*) and 34(*d*), respectively, the amount of displacement is corrected by controlling the optical system in the exposure unit, using an actuator.

In the case of the bend error shown in FIG. 34(*e*), however, the amount of displacement cannot be determined with accuracy. Therefore, increasing accuracy in assembling lenses of the exposure unit copes with the error, instead of correction.

Through the procedures described above, the amount of displacement by color is detected then properly corrected according to the amount of displacement.

The cause of positional displacement, however, is not limited to the displacements categorized into five patterns above (hereinafter referred to as DC-component displacement). For example, irregularities in the thickness of the belt in the moving direction, an off-centered axis of a driving roller, an off-centered axis of a gear that drives the roller, an off-centered axis of a photosensitive drum, and an off-centered axis of a gear that drives the drum can also cause displacement. Therefore, even though the DC-component displacement has been corrected properly, a displacement caused by rotators including rollers, gears, and drums according to each rotation cycle, is not avoidable once they are driven to rotate.

For example, the displacement from an off-centered driving roller repeatedly occurs in the same page of a sheet material due to its incidence with a short cycle, while the displacement from variations in the thickness of the belt repeatedly occurs over pages of a sheet material due to its incidence with a long cycle.

Such a positional displacement caused by the rotation cycle of a rotator is referred to as AC-component displacement hereinafter.

SUMMARY OF THE INVENTION

It is therefore the object of the present invention to provide a color-image forming apparatus capable of minimizing a typical AC-component displacement, which is displacement in the toner image mainly caused by variations in the thickness of the inter-stage transfer belt.

In order to achieve this object, according to the color-image forming apparatus of the present invention, a plurality of image-forming stations contain a developing unit corresponding to the color, by which an electrostatic latent image formed on a photosensitive body is developed into a toner image. The exposure unit forms an electrostatic latent image on the bodies through light radiation.

An individually colored toner-image formed in a plurality of image-forming stations is transferred onto the inter-stage transfer belt one after another to obtain an overlapped image.

A plurality of the image-forming stations contain its own pattern detector. Each pattern detector detects displacement in toner image respectively formed in an image-forming station according to the registration reference pattern (hereinafter referred to as reference pattern) that is transferred one after another onto the belt.

The displacement corrector controls the image-forming timing provided by the exposure unit according to the result obtained from the pattern detector, that is, according to displacement information on the belt.

Such structured apparatus can minimize displacement in the toner image caused by irregularities in the thickness of the belt, correcting displacement on an image-forming basis.

BRIEF DESCRIPTION OF THE DRAWINGS

FIG. 16 shows information on the belt position stored in the memory of the CPU and an amount of displacement corresponding to the information in the apparatus of the embodiment.

FIG. 18 shows the state in which displacement within a print range has been detected according to the information on the belt position stored in memory of the CPU in the apparatus of the embodiment.

FIG. 31 shows information on the belt position stored in the memory of the CPU and an amount of displacement corresponding to the information in the apparatus of the third preferred embodiment.

FIG. 34 shows typical patterns of displacement observed in transferred images.

FIGS. 37 and 38 show the layout of the reference pattern on the belt and the pattern detector, and the output signal of the pattern detector as well.

DETAILED DESCRIPTION OF THE INVENTION

The preferred embodiments of the present invention are described hereinafter with reference to the accompanying drawings, FIG. 1 through FIG. 33.

First Preferred Embodiment

Figure 1:
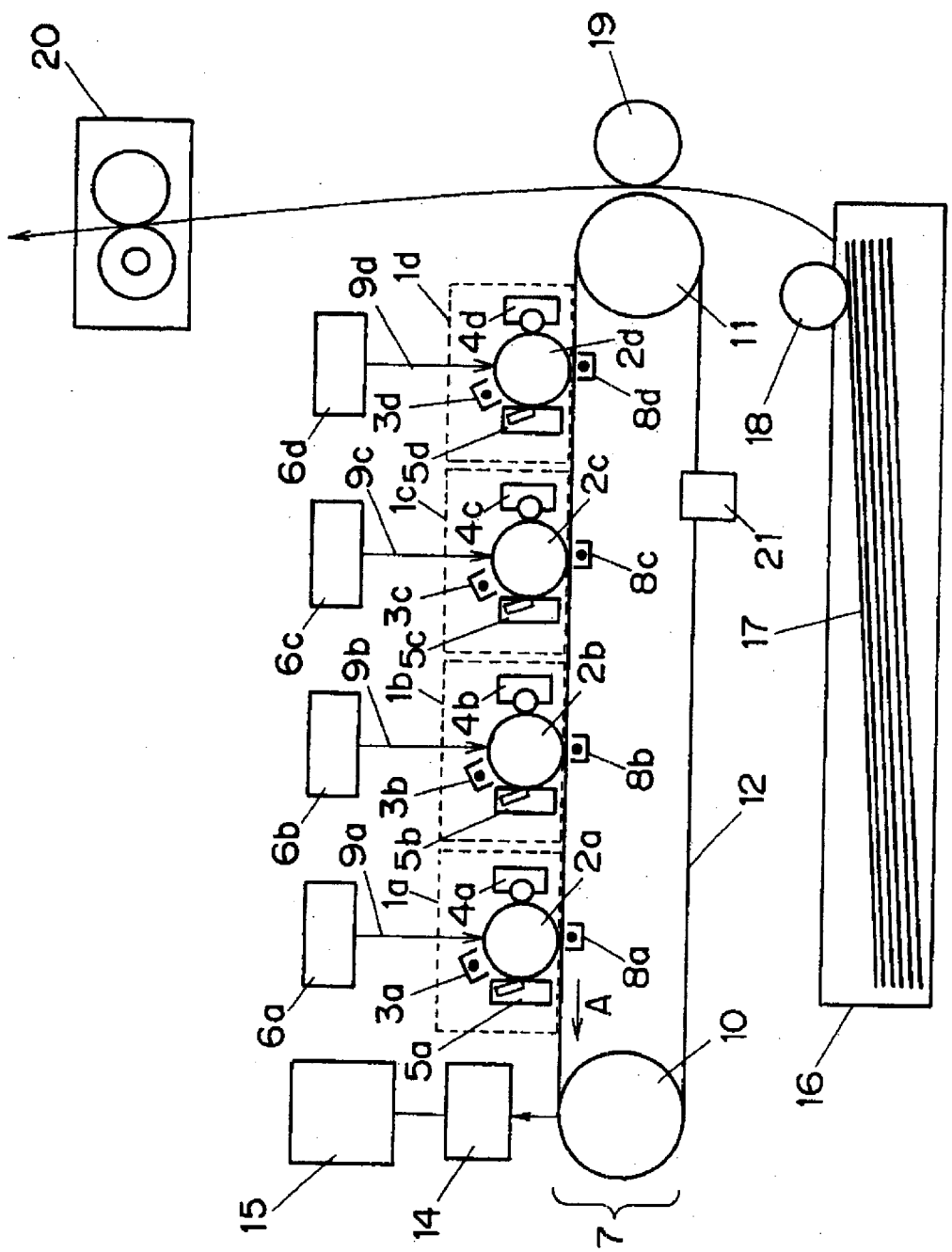
FIG. 1 schematically shows the structure of the color-image forming apparatus in accordance with a first preferred embodiment of the present invention.

FIG. 1 schematically shows the structure of the color-image forming apparatus in accordance with the first preferred embodiment of the present invention. In FIG. 1, the apparatus has four image-forming stations $1a$, $1b$, $1c$, and $1d$. Each station has a photosensitive drum (photosensitive body) $2a$, $2b$, $2c$, and $2d$, respectively, as an image carrier. Arranged around the respective drums are: chargers $3a$, $3b$, $3c$, and $3d$ charging evenly on the surfaces of drums $2a$, $2b$, $2c$, and $2d$; developing units $4a$, $4b$, $4c$, and $4d$ developing an electrostatic latent image into a visible toner image; cleaners $5a$, $5b$, $5c$, and $5d$ cleaning out residual toner; scanning optical system-employed exposure units $6a$, $6b$, $6c$, and $6d$ providing drums $2a$, $2b$, $2c$, and $2d$, respectively, with light radiation according to image information; and transfer units $8a$, $8b$, $8c$, and $8d$ transferring toner images onto an inter-stage transfer belt (hereinafter simply referred to as belt) 12 that forms part of inter-stage transfer unit 7.

In image-forming stations $1a$, $1b$, $1c$, and $1d$, yellow (Y)-, magenta (M)-, cyan (C)-, and black (K)-images are formed, and exposure units $6a$, $6b$, $6c$, and $6d$ provide exposure light $9a$, $9b$, $9c$, and $9d$ (corresponding to each of four images) to each of the images. Below drums $2a$, $2b$, $2c$, and $2d$, endless belt 12 is arranged so as to pass by stations $1a$, $1b$, $1c$, and $1d$, traveling around in the direction indicated by arrow A. Driving rollers 10 and 11 support belt 12.

Arranged opposite to belt 12, pattern detector 14 detects the reference pattern from the reference-pattern generator, and displacement amount calculator 15 calculates the amount of displacement between the toner images according to the result from detector 14. Pattern detector 14 is disposed on both sides of belt 12 with respect to its widthwise direction.

Sheet material 17 loaded in paper cassette 16 is fed by paper-feed roller 18 and carried to sheet material transfer roller 19, then fixing unit 20, and ejected on the ejecting tray.

According to the color-image forming apparatus having a structure as described above, on photosensitive drum $2d$ in image-forming station $1d$, a latent image having a black component color (as image information) is formed by a well known xerographic process unit employing charger $3d$ and exposure unit $6d$. After that, at developing unit $4d$, the latent image is developed into a visible toner image using a developing material having black toner. The black toner image is transferred onto belt 12 in transfer unit $8d$.

In the meantime (i.e., while the black toner image is being transferred onto belt 12), a latent image in a cyan component color is formed in image-forming station $1c$, and the formed image is developed into a visible cyan-toner image in developing unit $4c$. In transfer unit $8c$, the cyan-toner image is transferred onto belt 12 so as to overlap with the black-toner image that has already been on belt 12.

When image forming of magenta- and yellow-toner images is completed in the same way as described above, belt 12 now carries four-color toner images overlapped one after another thereon. After that, the four-color toner images are transferred in one operation by paper-feed roller 18 onto sheet material 17, which is supplied from paper cassette 16, by sheet material transfer roller 19. The transferred toner images are fixed by heat in fixing unit 20, so that a full-color image appears on sheet material 17.

Meanwhile, in the image-forming stations, for the finish operation of one printing, cleaners 5a, 5b, 5c, and 5d clean off residual toner on drums 2a, 2b, 2c, and 2d, respectively, which have completed the transferring process, so as to prepare the next image-forming process.

Figure 2:
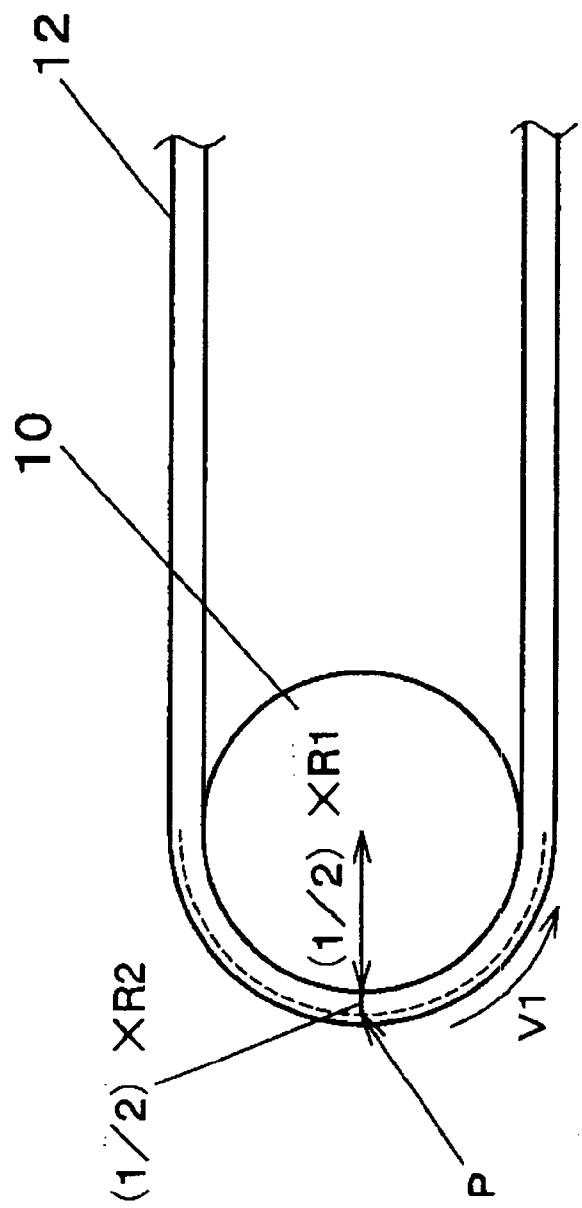
FIG. 2 illustrates the relationship between the driving roller and the inter-stage transfer belt of the apparatus of the first preferred embodiment.
Figure 3:
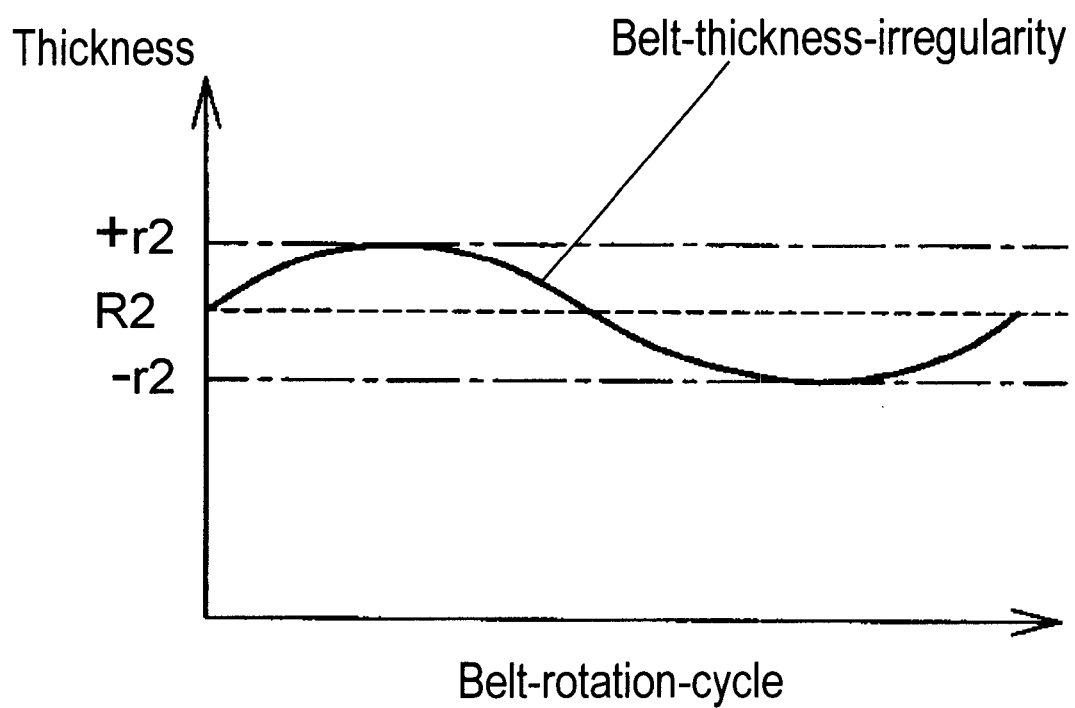
FIG. 3 is a graph indicating irregularities in the thickness of the belt of the apparatus of the embodiment.

In FIG. 2, position P is determined by adding half the length of diameter R1 of driving roller 10 to half the thickness R2 of belt 12. Now suppose that the speed of belt 12 is obtained at this position P, speed V1 of belt 12 is given by the following equation:

$$V1=(½) \times (R1+R2) \times \omega 1 \quad (1)$$

Where, R1 indicates driving roller 10's diameter; R2 indicates the thickness of the belt; $\omega 1$ indicates the angular speed of driving roller 10.

Although belt 12 is supposed to have a thickness of around 150 $\mu$m, it is very difficult to make a belt having an even thickness over its whole length. The belt therefore has irregularities of around several ten $\mu$m. If the irregularities draw a sine wave having amplitude up to $\pm r2$ with respect to thickness width R2 over one cycle of travel of the belt, then thickness irregularities R2' in belt 12 over one cycle of travel are given by the following equation:

$$R2'=(½) \times (R2+r2 \times \sin \omega 2t) \quad (2)$$

Where, $\omega 2$ indicates the angular speed of the belt.

Substituting R2' of Eq. (2) into R2 of Eq. (1) yields variable speed V1' of belt 12 as its thickness varies as follows:

$$V1'=(½) \times (R1+R2+r2 \times \sin \omega 2t) \times \omega 1=(½) \times (R1+R2) \times \omega 1+((½) \times r2 \times \omega 1) \times \sin \omega 2t = V1+v2 \times \sin \omega 2t \quad (3)$$

Where, v2 indicates the maximum speed depending on the amount of off-center r2.

Figure 4:
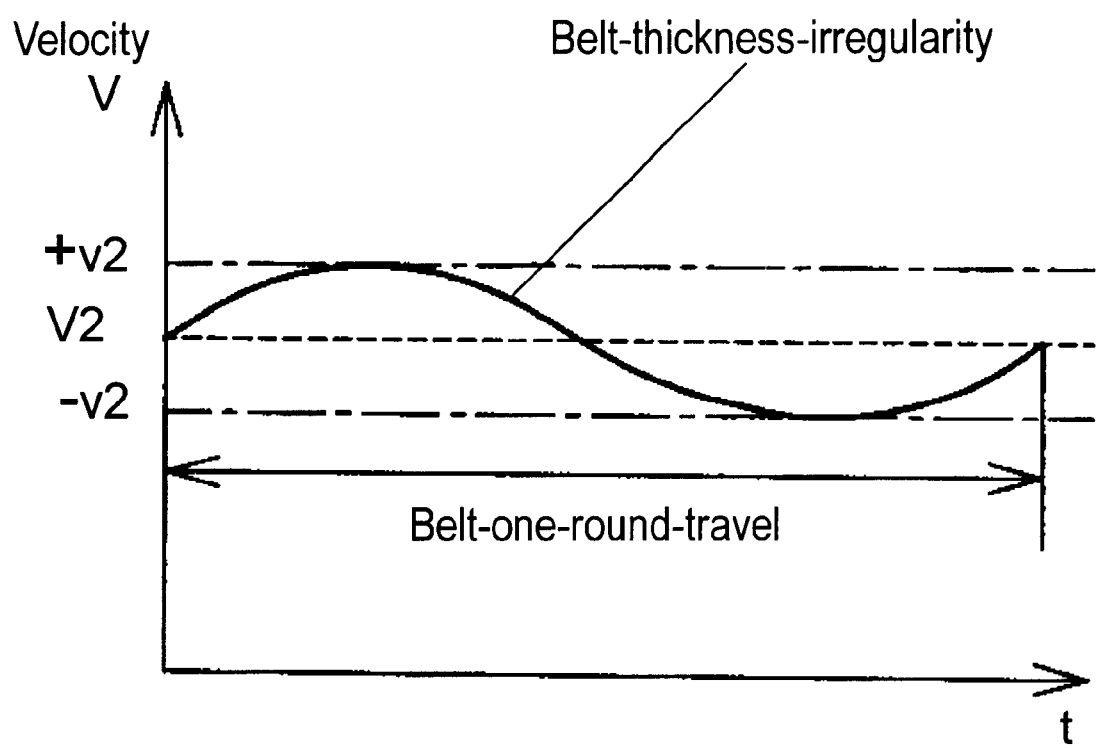
FIG. 4 is a graph indicating the relationship between irregularities in the thickness of the belt and variations in traveling speed of the belt.

The equation above indicates that irregularities in thickness of belt 12 change the speed of belt 12 in during a cycle of its traveling (see FIG. 4.)

Changes in distance Lb' of belt 12 for time t at variable speed V1' is given by Eq. (4) below:

$$Lb'=V1' \times t= \int t(V1+v2 \times \sin \omega 2t) dt = V1 \times t + (v2/\omega 2)([-\cos \omega 2t]t = V1 \times t + r2 \times [-\cos \omega 2t]t \quad (4)$$

Substituting the equations, V1 (t=Lb, r2 ([(cos (2t] t=$\Delta$Lb into Eq. (4) simplifies Eq. (4) to Eq. (5) below:

$$Lb'=Lb+\Delta Lb \quad (5)$$

Eq. (5) indicates that changes in distance Lb'—the distance traveled by belt 12 over time t—is obtained by adding traveled distance $\Delta$Lb due to irregularities in thickness r2 of belt 12 to distance Lb—the distance traveled by belt 12 at fixed speed V1.

Figure 5:
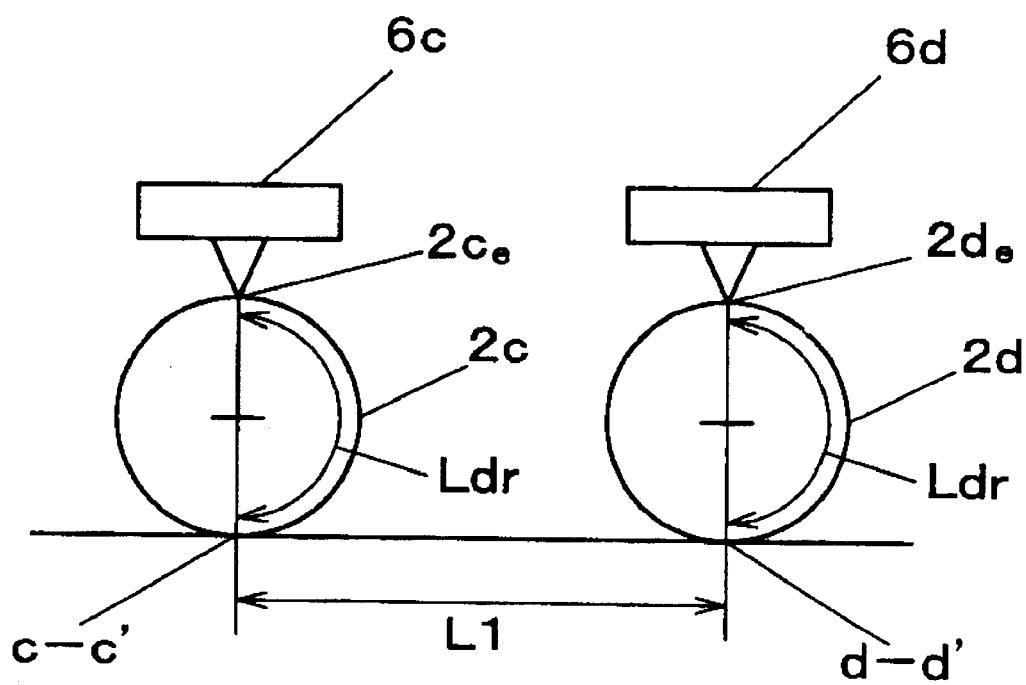
FIG. 5 illustrates the positional relationship between the belt and two photosensitive drums of the apparatus of the embodiment.

Now will be described the process of overlapping one colored image with another—for example, between drums 2c and 2d. As shown in FIG. 5, the distance L2d from position 2de on drum 2d exposed by exposure unit 6d to tangent c–c' made by drum 2c and belt 12 is given by the following equation:

$$L2d=Ldr+L1 \quad (6)$$

Where, Ldr indicates the distance of half the circumference of drums 2c and 2d, L1 indicates the distance between tangent c–c' and tangent d–d'.

On the other hand, distance L2c from position 2ce on drum 2c exposed by unit 6c to tangent c–c' is given by the following equation:

$$L2c=Ldr \quad (7)$$

Figure 6:
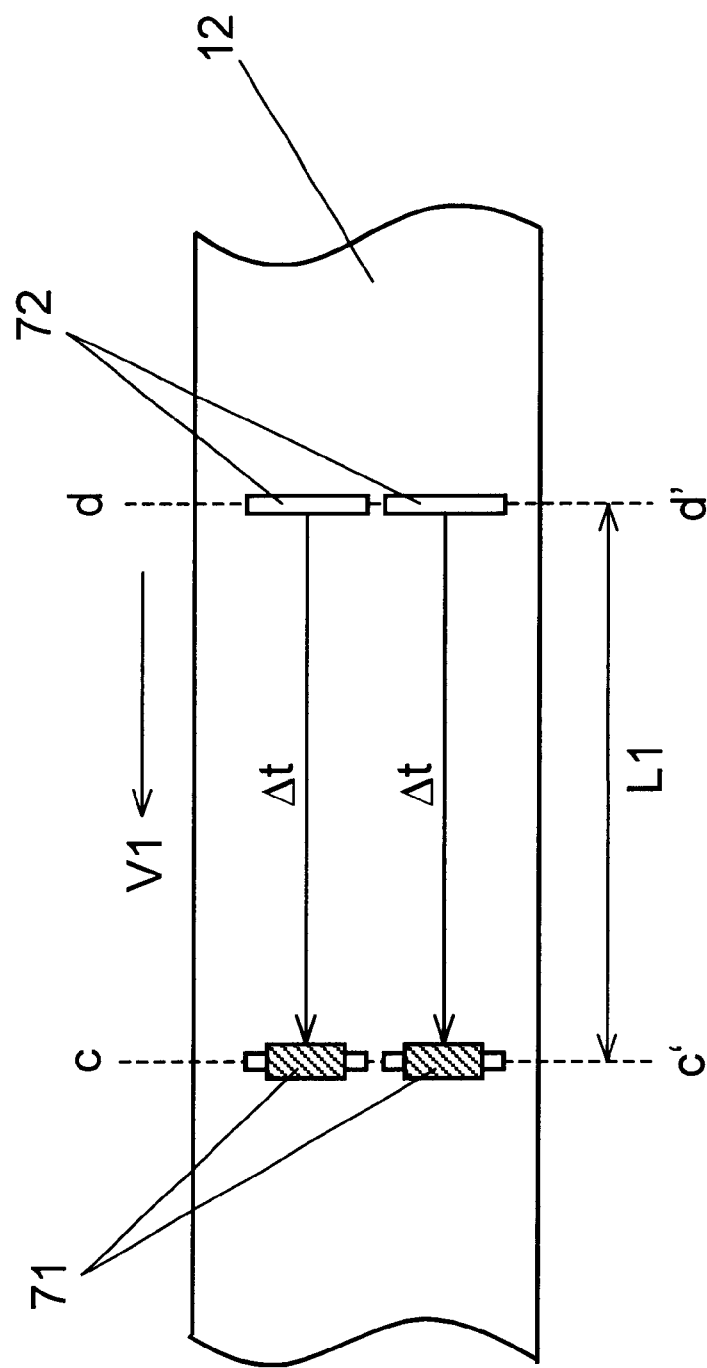
FIG. 6 illustrates the positional relationship between two toner-images when the belt runs at an optimal speed.

As shown in FIG. 6, toner image 72 transferred onto belt 12 at the position indicated by tangent d–d' is carried over time $\Delta t$ as shown in FIG. 6 (provided that belt 12 travels at optimal speed V1) to the position of tangent c–c' made by belt 12 and drum 2c a distance L1 away from drum 2d.

$$\Delta t = L1/V1 \quad (8)$$

More specifically, the difference between distance L2c (i.e., the distance from the exposure-starting position on drum 2c to tangent c–c') and distance L2d (i.e., the distance from the exposure-starting position on drum 2d to tangent c–c') is equal to L1, since drums 2c and 2d have distance Ldr in common. That is, delaying the exposure-starting timing to drum 2c by exposure unit 6c by $\Delta t$ with respect to the exposure time to drum 2d by exposure unit 6d allows toner image 72 on drum 2d, as belt 12 moves, to reach tangent c–c' made by drum 2c and belt 12 when the toner image on drum 2c reaches tangent c–c'. Through the time-delayed exposure, the two color images are properly overlapped with each other.

Figure 7:
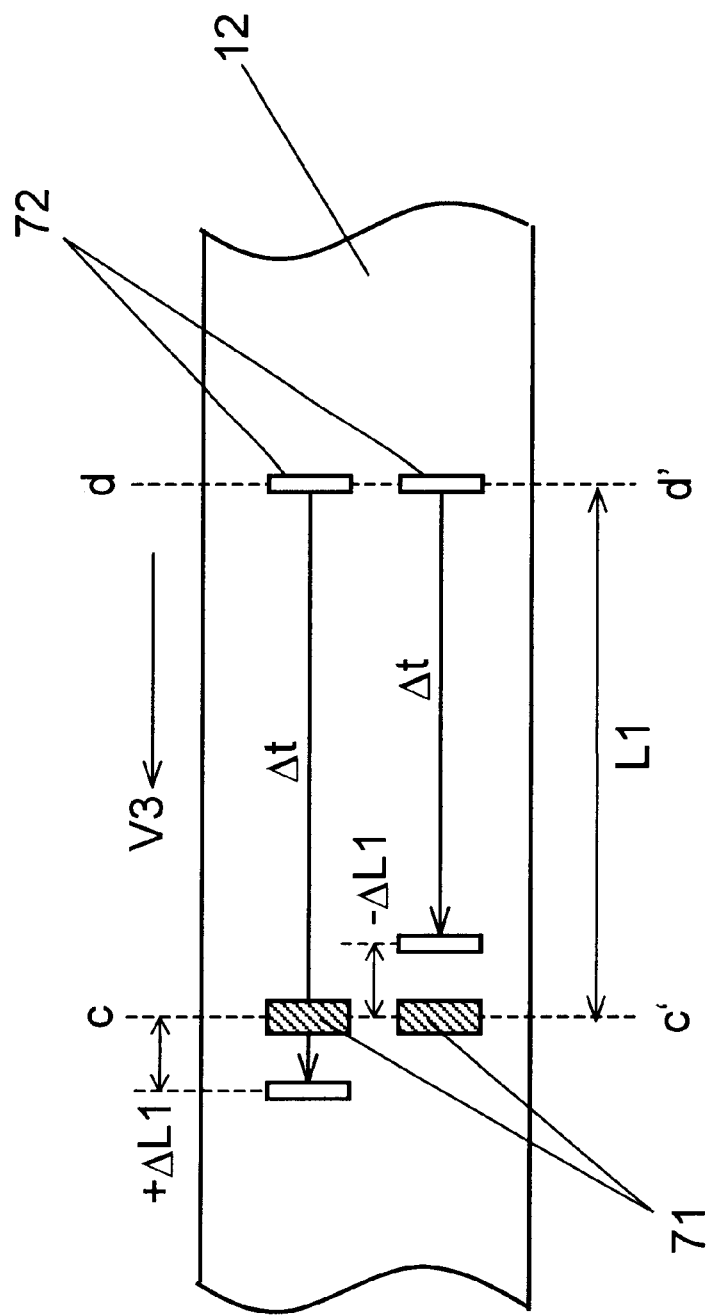
FIG. 7 illustrates the positional relationship between two toner-images when the belt changes its speed.

As is the case shown in FIG. 7, however, belt 12 travels at variable speed V1' due to irregularities in its thickness. Therefore, the toner image transferred at the position indicated by tangent d–d' made by drum 2d and belt 12 is not always on tangent c–c' made by drum 2c and belt 12 after a lapse of $\Delta t$, and it can be forward by $\Delta L1$ minutes, or can be delayed by $\Delta L1$ minutes. This is explained by the fact that replacing Lb of Eq. (4) and t of Eq. (5) with L1 and $\Delta t$, respectively, yields the following equations:

$$L1'=V1' \times \Delta t = V1 \times t + r2 \times [-\cos \omega 2t]t \quad (9)$$

$$L1'=L1+\Delta L1 \quad (10)$$

In other words, toner image 72 on drum 2d is not always on the position indicated by tangent c–c' made by drum 2c and belt 12 when toner image 71 on drum 2c reaches tangent c–c' made by drum 2c and belt 12, which causes displacement between the two toner images. Thus, as described above, irregularities in the thickness of belt 12 causes displacement between the images.

Figure 8:
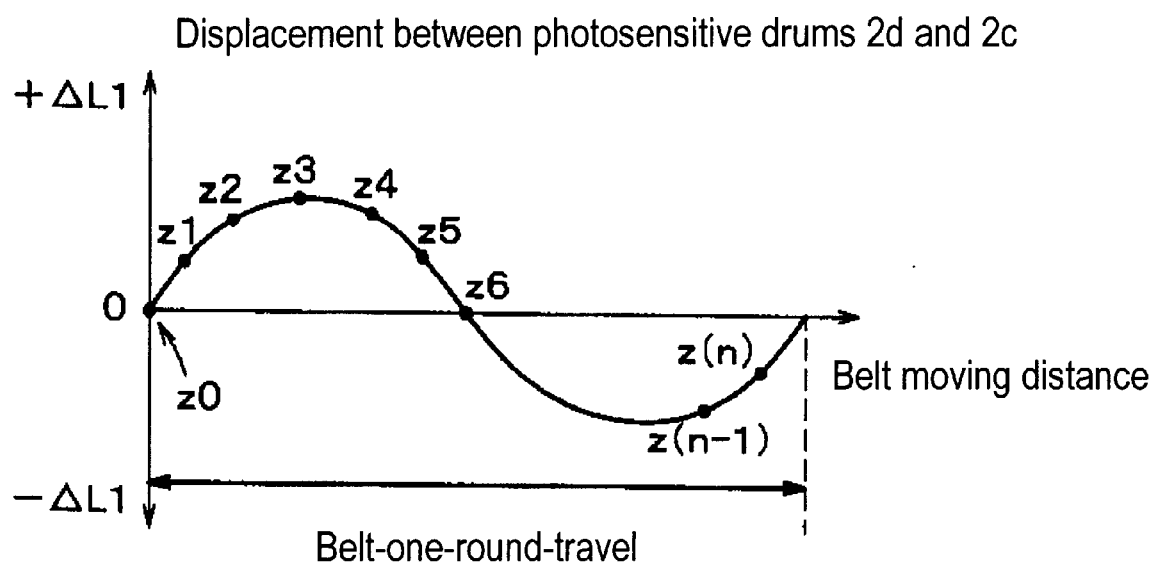
FIG. 8 is a graph indicating displacement between two toner images observed over one cycle of travel of the belt of the apparatus of the embodiment.

FIG. 8 shows displacement between two drums 2d and 2c observed over one-round (one cycle) of travel of the belt. It is apparent from the figure that the displacement varies ranging from $-\Delta L$ to $+\Delta L$ corresponding to variable speed V1' of belt 12. The amount of displacement at each position on one cycle of travel of belt 12 is represented by z1, z2, z3, z4, ..., z(n–1), z(n) in FIG. 8, which are to be stored in the memory of displacement amount calculator 15 in the CPU (will be described later) as discrete data obtained at spaced intervals.

Figure 9:
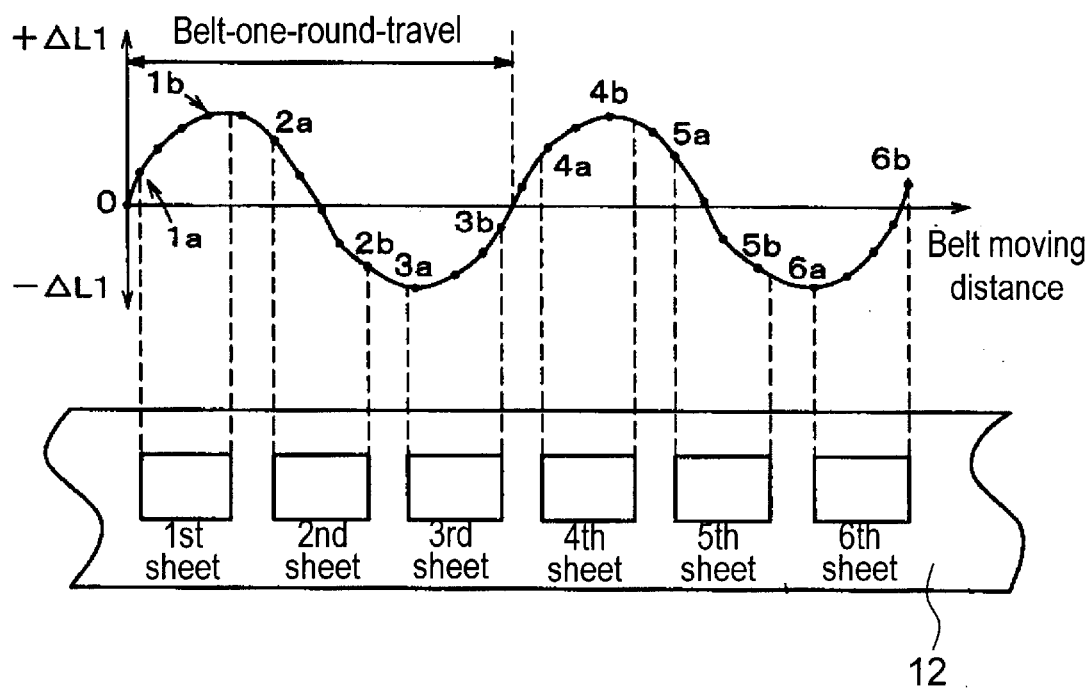
FIG. 9 illustrates the relationship between the position of a sheet put on the belt and the detected displacement in continuous printing in the apparatus of the embodiment.

According to the embodiment, one cycle of belt 12 has a length of about 1100 mm—the equivalent of about 3 pages of A4-sized cut sheet in continuous printing. FIG. 9 illustrates the relationship between the positions of A4-sized cut sheets put on the belt, and detected displacement between drums 2d–2c over two cycles of travel of the belt when continuous printing is performed. In FIG. 9, displacement occurred in each page as indicated by the ranges below:

Page 1: 1a through 1b: 0 through $+\Delta L$

Page 2: 2a through 2b: $+\Delta L$ through $-\Delta L$

Page 3: 3a through 3b: −ΔL through 0

Page 4: 4a through 4b: 0 through +ΔL

Page 5: 5a through 5b: +ΔL through −ΔL

Page 6: 6a through 6b: −ΔL through 0 (11)

Displacement observed in each page, as shown above, has a different range. For example, in the first page, displacement observed in the toner image on drum 2d ranges only in the plus direction with respect to the toner image on drum 2c, while in the second page, displacement in the toner image on drum 2d lies in a range from minus to plus. In the third page, the amount of displacement is now coming back to zero from the minus range. In addition, the bigger absolute value the measurement has, the larger displacement is observed in both ranges of plus and minus. The relationship of displacement between the three pages is represented as follows:

$$|2a-2b|>|1a-1b|\approx|3a-3b|, 1b>2a>1a, |3a|>|2b|>|3b| \qquad (12)$$

It is apparent from expression (12) that the second page has the widest range of variations in displacement, while the first and third pages have a bigger maximum amount of displacement than the second page.

Considering the fact that the amount of displacement differs page by page, an object of the present invention is to minimize the page-by-page maximum value of the amount of displacement.

Figure 10:
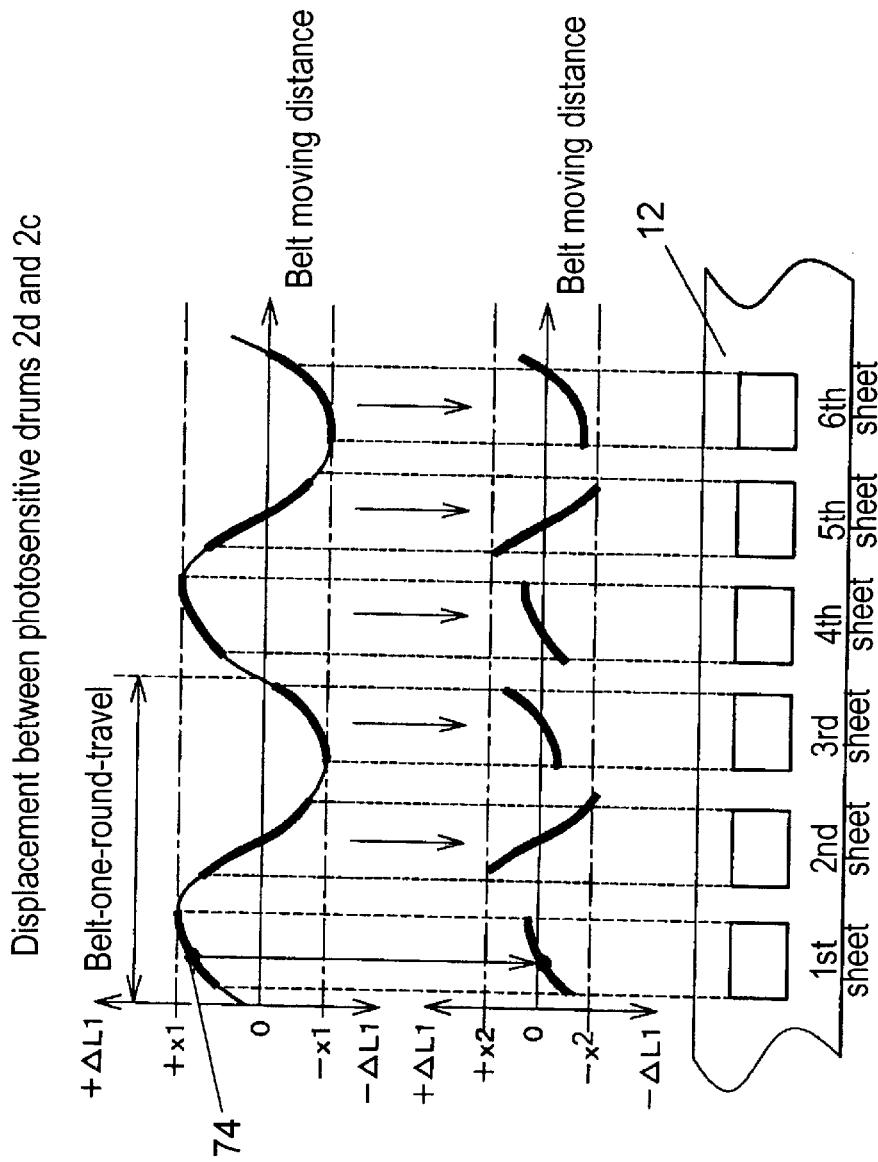
FIG. 10 shows the toner-image forming state in the apparatus of the embodiment.

More specifically, as shown in FIG. 10, the page-by-page mean value of the amount of displacement in a cut sheet is obtained from information on the amount of displacement amount. For example, the printing-start position of each page is corrected by the exposure timing so that mean value 74 of the amount of displacement in the first page is equal to the zero-position in displacement. With the correction, the relationship between the maximum values of displacements before and after correction is given by the following expression, so that the amount of displacement in each page can be decreased.

$$|x1|>|x2| \qquad (13)$$

Now, the procedures for displacement detection and correction will be described.

Figure 11:
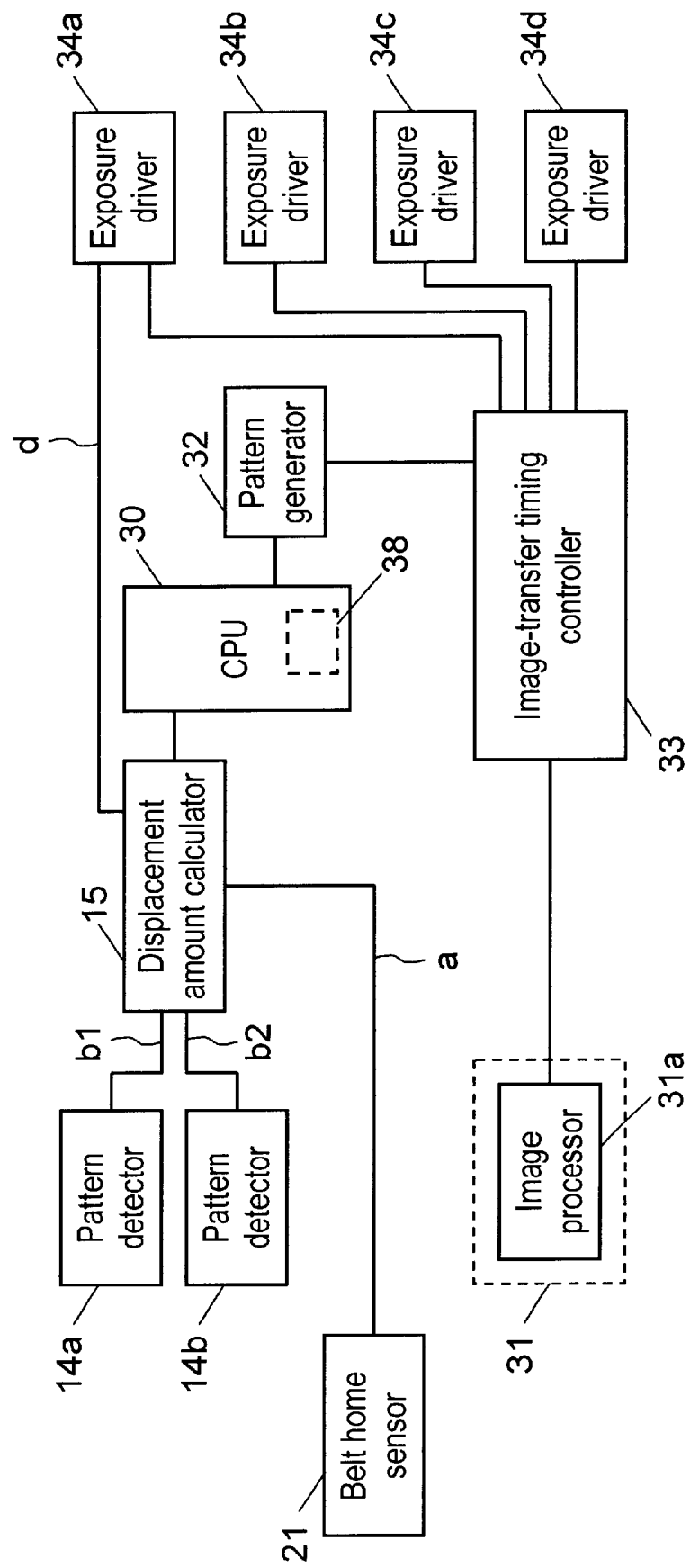
FIG. 11 is a block diagram indicating the circuit structure of the apparatus of the embodiment.

According to the color-image forming apparatus of the embodiment, as shown in FIG. 11, belt home sensor 21 detects the home position of belt 12. Pattern detectors 14a and 14b are disposed at both sides of belt 12 in the forward direction of the belt. Displacement amount calculator 15 calculates the amount of displacement. Host computer 31 serves as an image processor of a personal computer having image processor 31a. Pattern generator 32 generates the registration pattern. Image-transfer timing controller 33 selects image data from image processor 31a and pattern generator 32, and transfers them to exposure units 6a, 6b, 6c, and 6d with proper timing provided. Exposure drivers 34a, 34b, 34c, and 34d drive exposure units 6a, 6b, 6c, and 6d, respectively. CPU 30 is a general controller of the apparatus and also works as the displacement corrector.

In the color-image forming apparatus having the structure above, CPU 30 starts the initial operation in response to turning the power ON or an operation of the cover of the apparatus. Following the initial operation of the apparatus, home-position hole 22 in FIG. 12 passes through belt home sensor 21 of belt 12, as the belt travels. At this moment, signal line 'a' in FIG. 11 has a home signal shown in 'a' of FIG. 13, which is fed into displacement amount calculator 15 (will be described later.) At the same time, calculator 15 gives a home-signal interrupt to CPU 30.

In response to the interruption, CPU 30 requests that pattern generator 32 start generating reference-pattern data. Image-transfer timing controller 33 receives the reference-pattern data generated in pattern generator 32 one after another, and then transfers them, at established intervals, to exposure driver 34a, 34b, 34c, and 34d corresponding to exposure units 6a, 6b, 6c, and 6d, respectively. Driven by the transfer, exposure units 6a, 6b, 6c, and 6d provide photosensitive drums 2a, 2b, 2c, and 2d with light radiation, respectively, to form four-color reference-pattern latent image on drums 2a, 2b, 2c, and 2d. Each latent image is developed into a visible toner image by developing units 4a, 4b, 4c, and 4d. The visualized toner images are transferred one after another onto belt 12 by transfer units 8a, 8b, 8c, and 8d.

Figure 12:
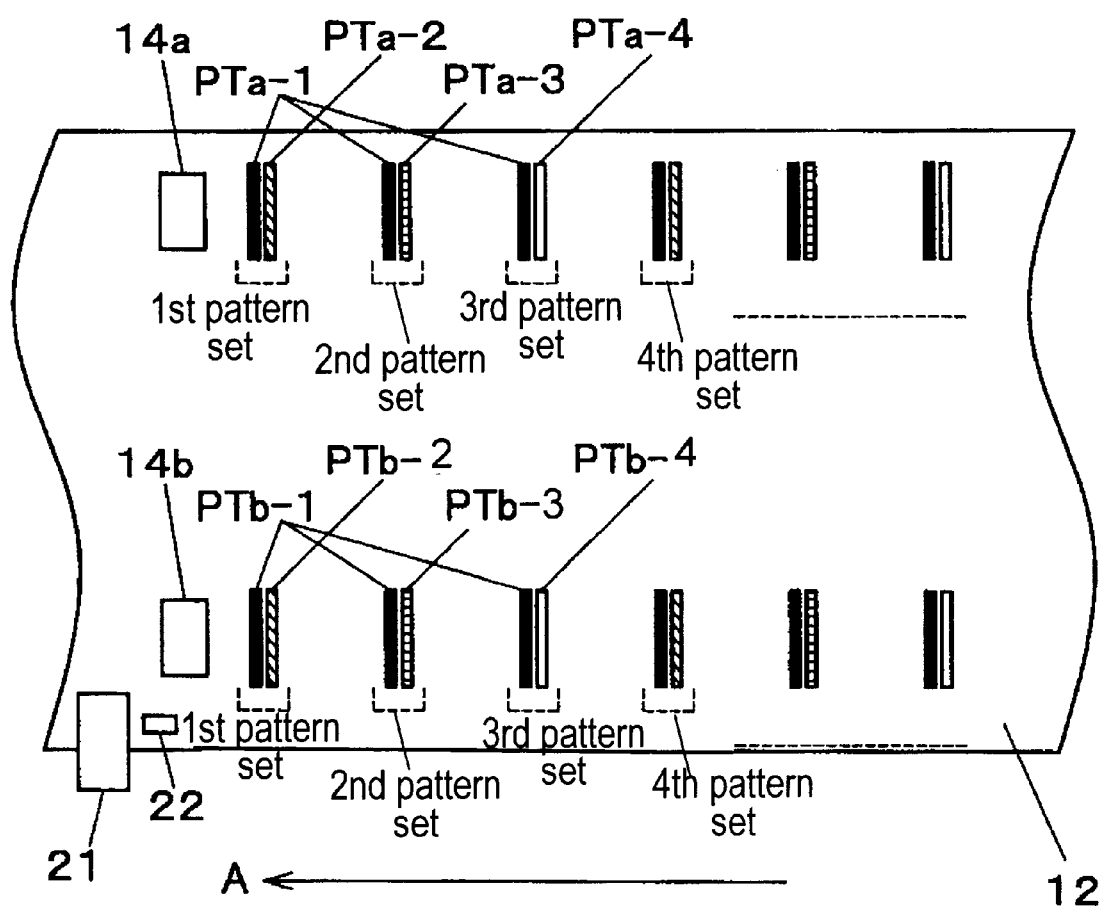
FIG. 12 shows the relationship between the home position of the belt and the position of the home sensor, and the arrangement of the reference pattern formed on the belt of the apparatus of the embodiment.

The reference pattern is formed of a series of pairs of the reference color and the selected one color among the other three colors. The reference pattern is formed one after another at fixed intervals at the both sides of belt 12 in the primary-scanning direction while the belt travels one cycle. FIG. 12 shows such a formed reference pattern. In FIG. 12, PTa-1 and PTb-1 have the reference color, while PTa-2, PTb-2, PTa-3, PTb-3, PTa-4, and PTb-4 have any one of the remaining three colors.

Figure 13:
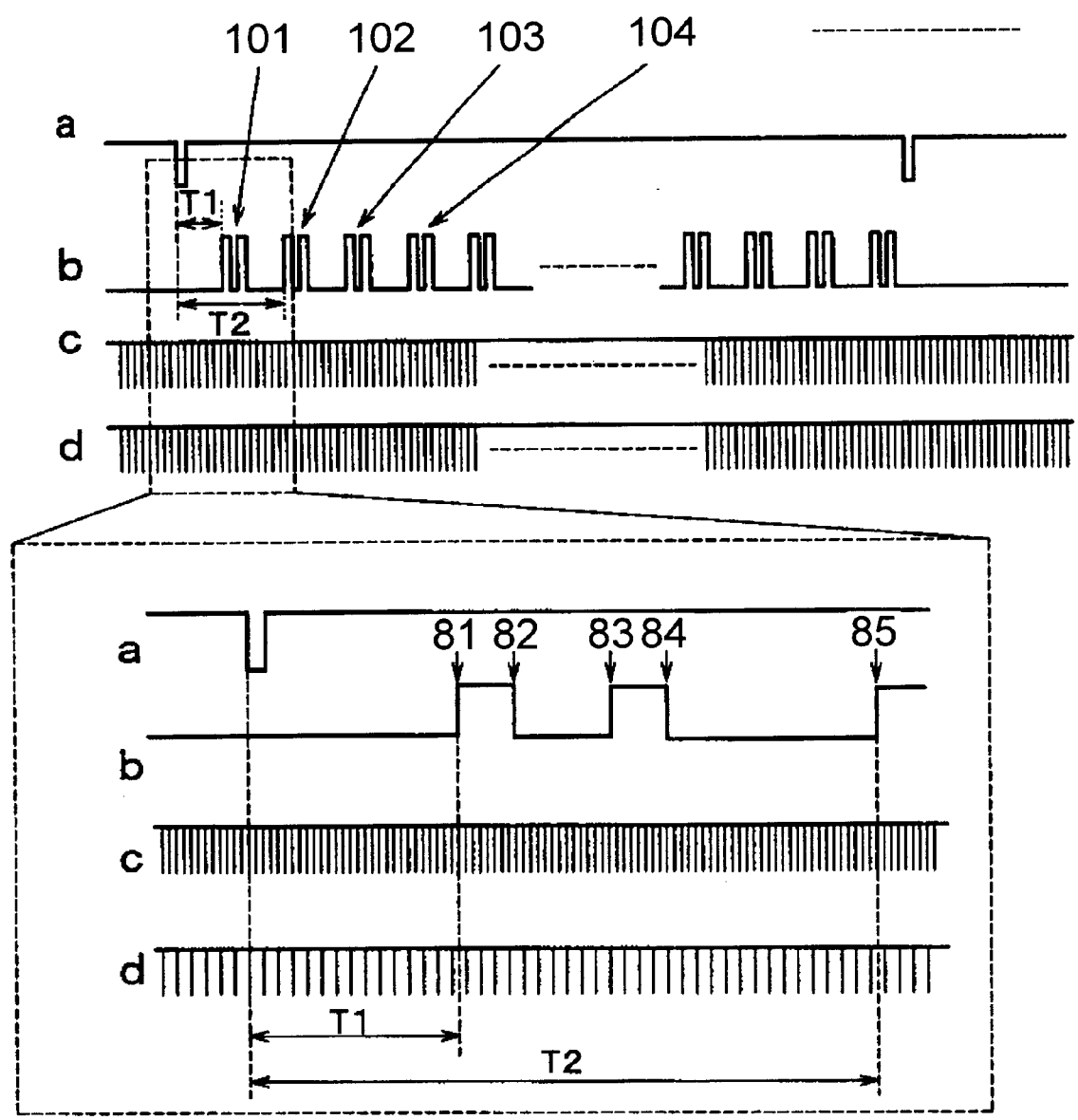
FIG. 13 shows the signal fed into a displacement amount calculator of the apparatus of the embodiment.

When time T1 has elapsed since home-position hole 22 of belt 12 was detected by belt home sensor 21, the reference pattern starts to pass through pattern detectors 14a and 14b. Signal b carries a reference-pattern signal detected by pattern detectors 14a and 14b. FIG. 13 shows the reference-pattern signal. Signal b, which is the signal having each pattern set (indicated by numerals 101, 102, 103, 104, ... in the figure), corresponds to output signals b1 and b2 from pattern detectors 14a and 14b in FIG. 11. Signals b1 and b2 are fed into displacement amount calculator 15. Calculator 15 also accepts clock signal c (FIG. 13) from the clock generator and horizontal synchronization signal d generated by exposure driver 34a responsible for the black (K) component color.

Figure 14:
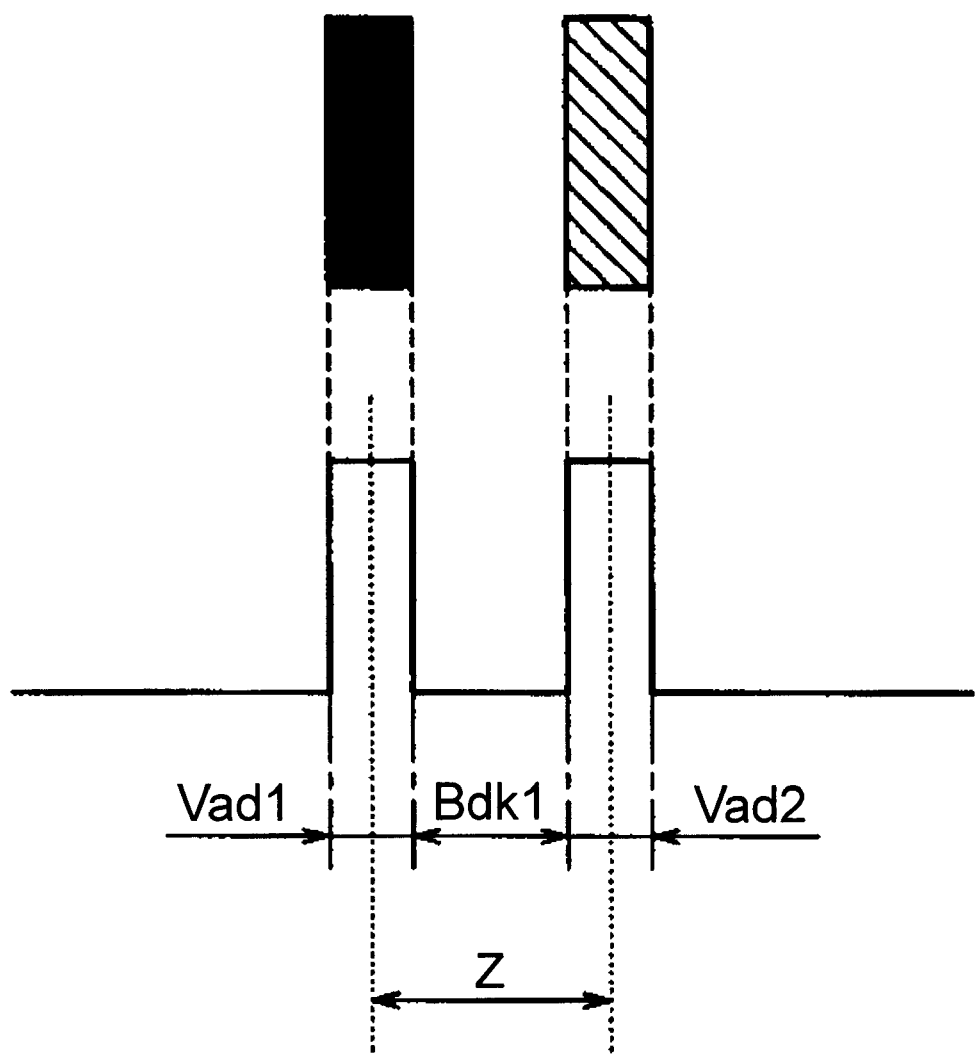
FIG. 14 shows the positional relationship between a reference color and a non-reference color in the apparatus of the embodiment.

Accepting pattern signals b1 and b2, displacement amount calculator 15 calculates, as shown in FIG. 14, pattern widths Vad1 and Vad2, which is the distance between the pattern sets, and pattern interval Bdk1, which is the distance between a reference color and the paired color. CPU 30 calculates positional displacement Z of a non-reference color with respect to a reference color from the following equation based on the captured Vad1, Vad2, and Bdk1, and stores it into its memory.

$$Z=\{(Vad1+Vad2)/2+Bdk1\}-C \qquad (14)$$

Where, C takes a theoretical value.

Displacement amount calculator 15 sequentially counts signal d, thereby determining the home position of belt 12 as a starting point. CPU 30 captures the count value of signal d at which the reference pattern is fed into calculator 15 and stores it, together with positional displacement Z, into its memory.

Figure 15:
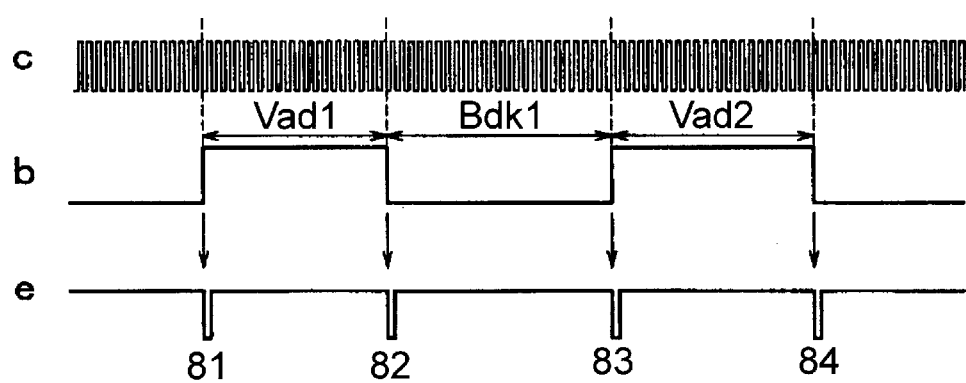
FIG. 15 shows the reference pattern-width count and an interrupt to the central processing unit (CPU) in the apparatus of the embodiment.

With reference to the time charts shown in FIGS. 13 and 15, a more specific explanation will be given below.

Accepting home signal 'a' of belt 12, displacement amount calculator 15 resets the counter for horizontal synchronization signal d, and restarts the count signal d. When time T1 has elapsed since home signal 'a' was accepted, the first pattern-set appears on signal lines b1 and b2. Calculator 15 detects the transition point (rising edge 81) of pattern signals b1 and b2, and starts to count the number of clock signal c for determining the count value of signal d. During the counting, CPU 30 captures the count value of signal d in response to interrupt signal e shown in FIG. 15, and stores the count value into its memory.

On detecting the next transition point—trailing edge 82, calculator 15 completes the counting and sends an interrupt signal to CPU 30. In response to the interrupt signal, CPU 30 captures the first count value (Vad1) therein. On the other hand, calculator 15 has already resumed the counting at the occurrence of the interruption. On detecting the next transition point (rising edge 83), CPU 30 captures the second count value (Bdk1) in response to an interrupt signal from calculator 15. Calculator 15 further starts the next count and keeps it until the next transition point (trailing edge 84) is detected. In response to an interrupt signal from calculator 15, CPU 30 captures the third count value (Vad2) and completes the capture.

CPU 30 calculates the positional displacement Z of a non-reference color with respect to the reference color from the three captured count values, Vad1, Bdk1, and Vad2. Calculated displacement Z is stored, together with the count value of horizontal synchronization signal d, into memory of CPU 30.

With these procedures above, CPU 30 completes the calculation of the first pattern-set and its capture into memory.

When time T2 has elapsed since home signal 'a' was accepted, as shown in FIGS. 12 and 13, calculator 15 detects the first transition point (rising edge 85) of the second pattern-set. Upon detecting this transition point, calculator 15 sends an interrupt signal to CPU 30, as in the case of capturing the first pattern-set. In response to the interruption, CPU 30 captures the count value of horizontal synchronization signal d and stores it into memory. At the same time, calculator 15 restarts the count of clock signal c and keeps the count until the next transition point (trailing edge) is detected. Upon completion of the counting by calculator 15, CPU 30 captures the count value (Vad1) into its memory. Like the procedure for capturing the first pattern-set, CPU 30 captures count values Bdk1, Vad2 and calculates positional displacement Z, and then stores calculated Z into its memory, together with the count value of horizontal synchronization signal d. In this way, CPU 30 completes the calculation of the second pattern-set and its storage into memory.

CPU 30 further repeats the procedures for the third and the fourth pattern-sets. When the procedures for the four pattern-sets are complete. The positional displacement Z of the pattern-sets for one cycle of travel of belt 12 and for each count value of horizontal synchronization signal d (i.e., positional information on belt 12) has now been captured in CPU 30.

FIG. 16 shows positional displacement Z and horizontal synchronization signal d corresponding to displacement Z, both of which are stored in the memory of CPU 30. The explanation of the references used in FIG. 16 will be given below:

$T_1y, T_2y, \ldots, T_ny$ indicate the count value of the horizontal synchronization signal when the K-Y pattern-set is detected;

$T_1m, T_2m, \ldots, T_nm$ indicate the count value of the horizontal synchronization signal when the K-M pattern-set is detected;

$T_1c, T_2c, \ldots, T_nc$ indicate the count value of the horizontal synchronization signal when the K-C pattern-set is detected;

$Z_1y, Z_2y, \ldots, Z_ny$ indicate the amount of displacement of the K-Y pattern-set;

$Z_1m, Z_2m, \ldots, Z_nm$ indicate the amount of displacement of the K-M pattern-set;

$Z_1c, Z_2c, \ldots, Z_nc$ indicate the amount of displacement of the K-C pattern-set.

After the completion of the entire detection, CPU 30 stops all of the driving systems to complete the initial operation.

Now will be described the printing procedures.

In response to the request for preparation of printing from host computer 31 in the apparatus, CPU 30 requests that the driving system for the four image-forming stations 1a, 1b, 1c, and 1d, and the driving system for belt 12 and fixing unit 20, start the operation of the four stations 1a, 1b, 1c, 1d, belt 12, and fixing unit 20. At the same time, CPU 30 provides the high-voltage generator with the instruction so that four image-forming stations 1a, 1b, 1c, and 1d get ready for image-forming procedures.

When belt 12 has a stable travel, and when fixing unit 20 has an optimal temperature for printing, CPU 30 sends back a "printing-ready" signal to host computer 31 in the apparatus. Receiving the signal, host computer 31 requests CPU 30 to start printing.

Figure 17:
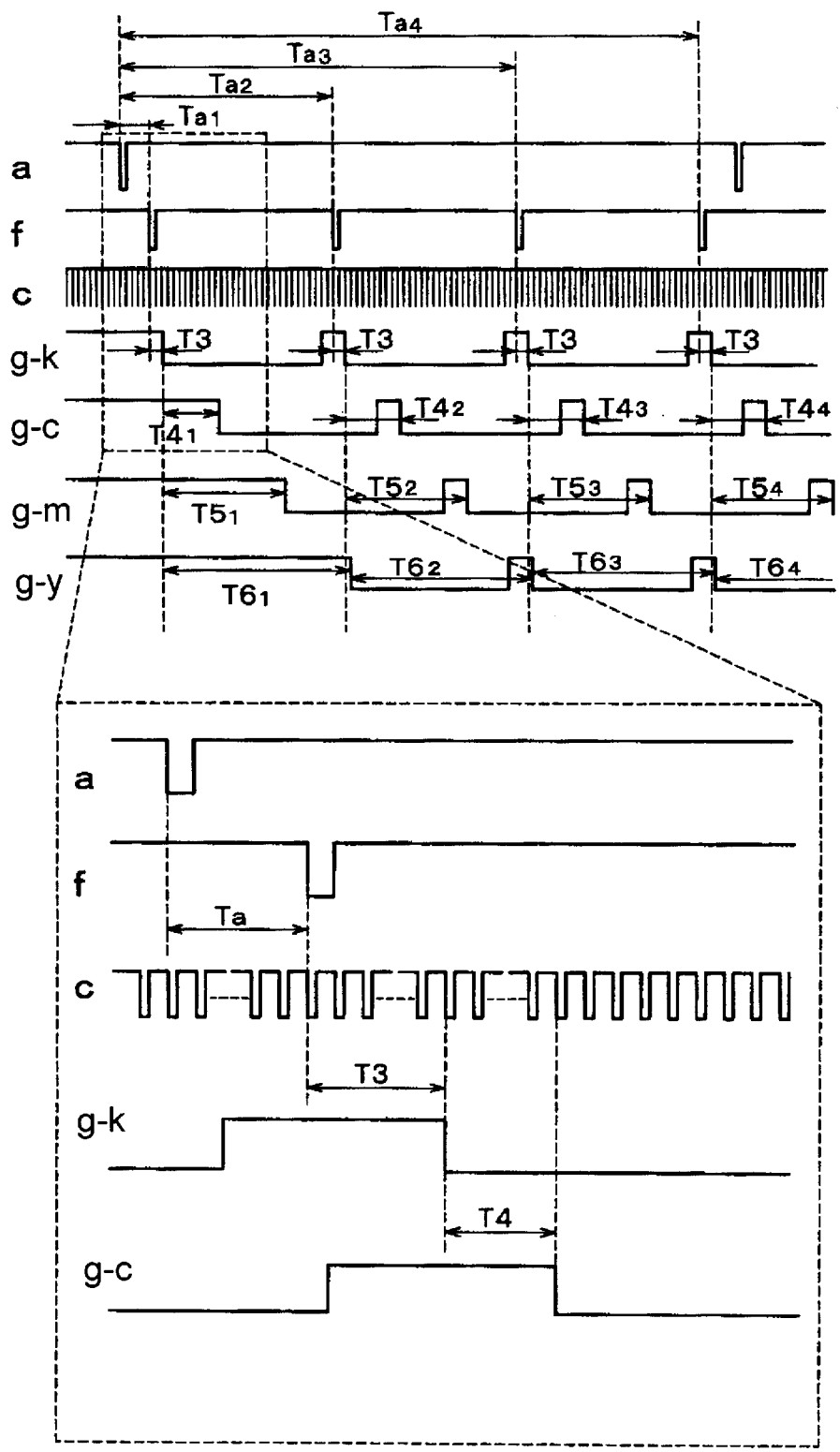
FIG. 17 shows changes in a vertical synchronization signal in the correcting step in the apparatus of the embodiment.

Upon detecting home signal 'a' of belt 12, as shown in FIG. 17, CPU 30 outputs printing-start signal f to image-transfer timing controller 33. Accepting the signal, controller 33 sends the image processor 31 a vertical synchronization signals g-k, g-c, g-m, and g-y. Each of these signals is generated after time T3, T4, T5, and T6 has elapsed since the moment at which printing-start signal f occurred, respectively. Controller 33 also outputs horizontal synchronization signal d and clock signal c. While vertical synchronization signals g-k, g-c, g-m, and g-y are active, image processor 31 outputs K-, C-, M-, and Y-image signals synchronized with the horizontal synchronization signal and the clock signal. Image-transfer timing controller 33 transfers the image signals for K, C, M, and Y to exposure driver 34a, 34b, 34c, and 34d, respectively. Following the transfer, exposure units 6a, 6b, 6c, and 6d provide image-forming stations 1a, 1b, 1c, and 1d with light radiation, respectively, for image-forming.

Now will be described in detail the timing control from the output of the printing-start signal f that is determined as a starting point until vertical synchronization signals g-k, g-c, g-m, and g-y are turned ON (active) at intervals over time.

The timing control of vertical synchronization signals g-k, g-c, g-m, and g-y by timing controller 33 is synchronized with signal d.

More specifically, each time T3, T4, T5, and T6 described earlier takes multiples of the time required for one cycle for horizontal synchronization signal d. The ON-timing of vertical synchronization signals g-k, g-c, g-m, and g-y is determined as follows: signal g-k goes active after time T3 has elapsed since printing-start signal f occurred; signal g-c goes active after time T4 has elapsed since the moment at which signal g-k turned ON; signals g-m and g-y go active after time T5, T6 has elapsed since the moment at which signal g-k turned ON, respectively. Before outputting signal f to the image-transfer timing controller 33, CPU 30 calculates each length of T3, T4, T5, T6 and transmits them to the register in timing controller 33.

Now will be described the calculations of T3, T4, T5, and T6.

Generally, a time required until signal g-k gets ready for outputting is prepared for T3 as the default value. T4, T5, and T6 are derived from the calculations below, taking the arrangement of drums 2a, 2b, 2c, and 2e into account.

$$T4 = L/1$$

$$T5 = L/1 \times 2$$

$$T6 = L/1 \times 3$$

Where, L indicates the distance between drums 2a and 2b (2b and 2c, or 2c and 2d), the value 1 means the scanning width for one line with respect to the horizontal synchronization signal.

If there is no displacement between K-Y, K-M, and K-C pattern sets, the printing operation having the setting above provides a successfully overlapped toner image on belt 12. Otherwise, the following correction will need to be performed by a displacement corrector, which includes the displacement amount calculator 15, the CPU 30, and the image-transfer timing controller 33.

In response to the printing-start request from host computer 31, CPU 30 communicates with displacement amount calculator 15 to capture count time Ta1 for horizontal synchronization signal d in order to recognize how far the belt has traveled from the home position. After that, CPU 30 sets the values of T3, T4, T5, and T6 to the register in image-transfer timing controller 33. In this case, CPU 30 properly determines each value, allowing for the correction amount of displacement to be expected at printing points on belt 12. When Tb represents the count time required to rotate halfway around drums 2a, 2b, 2c, and 2d, count time Tx, which is the time required for the first toner image with K component color to reach the tangent made by belt 12 and drum 2d since vertical synchronization signal g-k was outputted on detecting the home position of belt 12, can be estimated by the following equation:

$$Tx = Ta1 + T3 + Tb \qquad (15)$$

That is, the head of the K-toner image is transferred on a position a Tx-elapsed distance from the home position of belt 12. Suppose that vertical synchronization signal g-c is outputted with a timing of T4 as a default. In this case, displacement between the C-toner image and the K-toner image, which is expected when the C-toner image reaches the tangent between belt 12 and drum 2d, can be determined from the relationship between the count time of signal d and the positional displacement of Y-, M-, and C-toner images with respect to the K-toner image, which are pre-stored in the memory 38 of CPU 30.

FIG. 18 provides the count time of horizontal synchronization signal d and the positional displacement between the K-, and C-toner images corresponding to each count time of signal d. The table shows that the count time Txc-elapsed position from the home position of belt 12 has displacement between the K- and C-toner images of Zxc.

Figure 19:
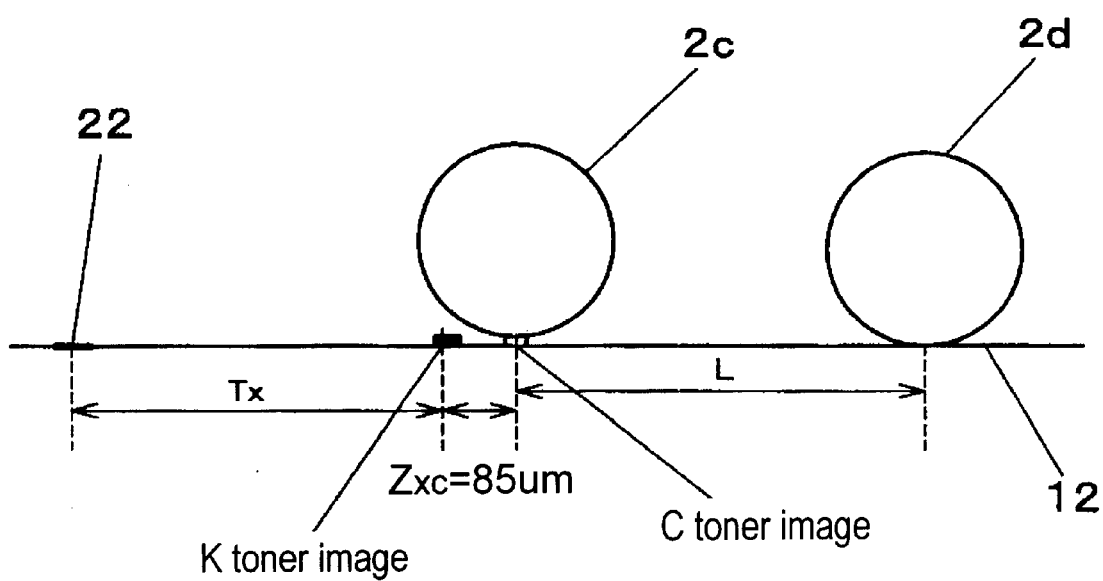
FIG. 19 shows the positional relationship between two photosensitive drums and two toner images formed on the belt in the apparatus of the embodiment.

FIG. 19 shows the positional relationship between the K- and C-toner images when Zxc is equal to +85 μm. As is apparent from FIG. 19, when the C-toner image is transferred to belt 12 at the position of the tangent made by belt 12 and drum 2d, the K-toner image is located 85 μm ahead—referred to as position X—on belt 12.

Suppose that positions X and X+K are determined as the printing-start position and printing-end position on belt 12, respectively. Then the mean value of the displacement between the K- and C-toner images in the range from X to X+K is given by the following equation:

$$Zave(K-C) = (Zxc + Z(X+1)C + \ldots + Z(X+K-1)C + Z(X+K)C)/(K+1) \qquad (16)$$

Now suppose that Zave (K-C) is equal to +150 μm. This means the K-toner image lies +150 (m ahead with respect to the position of the C-toner image all around the printing range. Therefore, in order to generally match the position of the K-toner image with the C-toner image, it is necessary to control the printing-start timing of the C-toner image to be +150 μm shorter than time T4.

Suppose that the apparatus has a vertical resolution of 600 dot/inch (dpi). In this case, one line of the horizontal synchronization signal has a width of 42.3 μm. From the equation below, the length of 150 μm corresponds to about 4 lines on the 600 dpi-resolution basis, so that displacement in this case should be corrected by 4 dots. In other words, correction is made on a dot-by-dot basis with respect to the resolution of the apparatus.

$$4 \cong 150/42.3 \qquad (17)$$

(where, one line: 600 dpi)

Therefore, value T41 correcting T4 is obtained by subtracting 4 lines from default value T4, as shown Eq. (18) below:

$$T41 = T4 - 4 \qquad (18)$$

Calculating values of T51 and T61 in a like manner, CPU 30 sends them to the register in image-transfer timing controller 33. After that, CPU 30 outputs printing-start signal f to timing controller 33. In response to the signal, controller 33 transmits to image processor 31 vertical synchronization signals g-k, g-c, g-m, and g-y after T3, T4, T5, and T6 have elapsed, respectively.

In continuous printing, as shown in FIG. 17, when vertical synchronization signal g-k is turned OFF, CPU 30 communicates with displacement amount calculator 15 to capture count time Ta2 for signal d in order to recognize how far the belt has traveled from the home position. CPU 30 calculates, according to captured Ta2, positional information on belt 12, including the mean values of displacements between the K- and the C-toner images, the K- and the M-toner images, and the K- and the Y-toner images, which are expected in the second page on belt 12. Furthermore, CPU 30 calculates values T42, T52, and T62 for the second page, allowing for the amount of correction with respect to default timing values T4, T5, and T6, respectively. After that, CPU 30 sets them to image-transfer timing controller 33.

Triggered by printing-start signal f sent from CPU 30, controller 33 starts to count T3, T42, T52, and T62, and then sets vertical synchronization signals g-k, g-c, g-m, and g-y to ON one after another. Correction will be done for the remaining pages on the belt CPU 30 through the procedure in the same way as that for the first and second pages.

In the color-image forming apparatus of the embodiment as described above, the image-forming timing by exposure units 6a, 6b, 6c, and 6d is controlled by capturing displacement information on the area of belt 12 carrying toner images therein, according to displacement information on one cycle of traveling of the belt, and calculating the mean value of displacement in the transferred area. Therefore, the page-by-page correction decreases displacement of toner images due to irregularities in thickness of belt 12, realizing an improved image forming with high quality.

Second Preferred Embodiment

Figure 20:
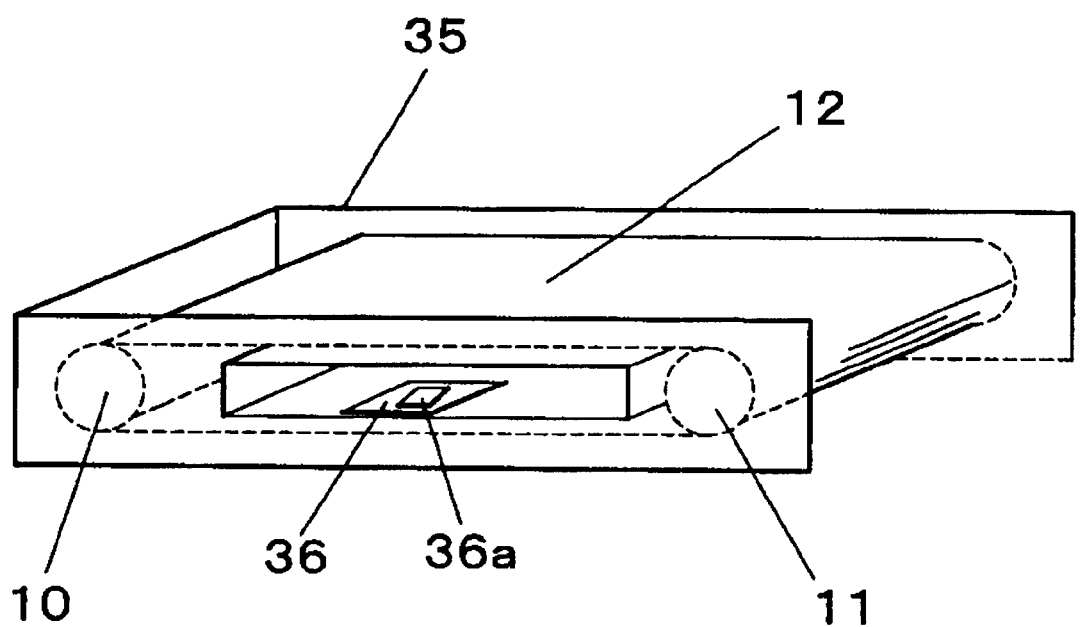
FIG. 20 is a perspective view indicating the structure of the inter-stage transfer belt unit of a color-image forming apparatus of a second preferred embodiment of the present invention.

FIG. 20 is a perspective view indicating the structure of the inter-stage transfer belt unit of a color-image forming apparatus of the second preferred embodiment of the present invention.

Belt 12 in FIG. 20 is configured as an inter-stage transfer belt unit 35 so as to be a detachable/attachable component.

Figure 21:
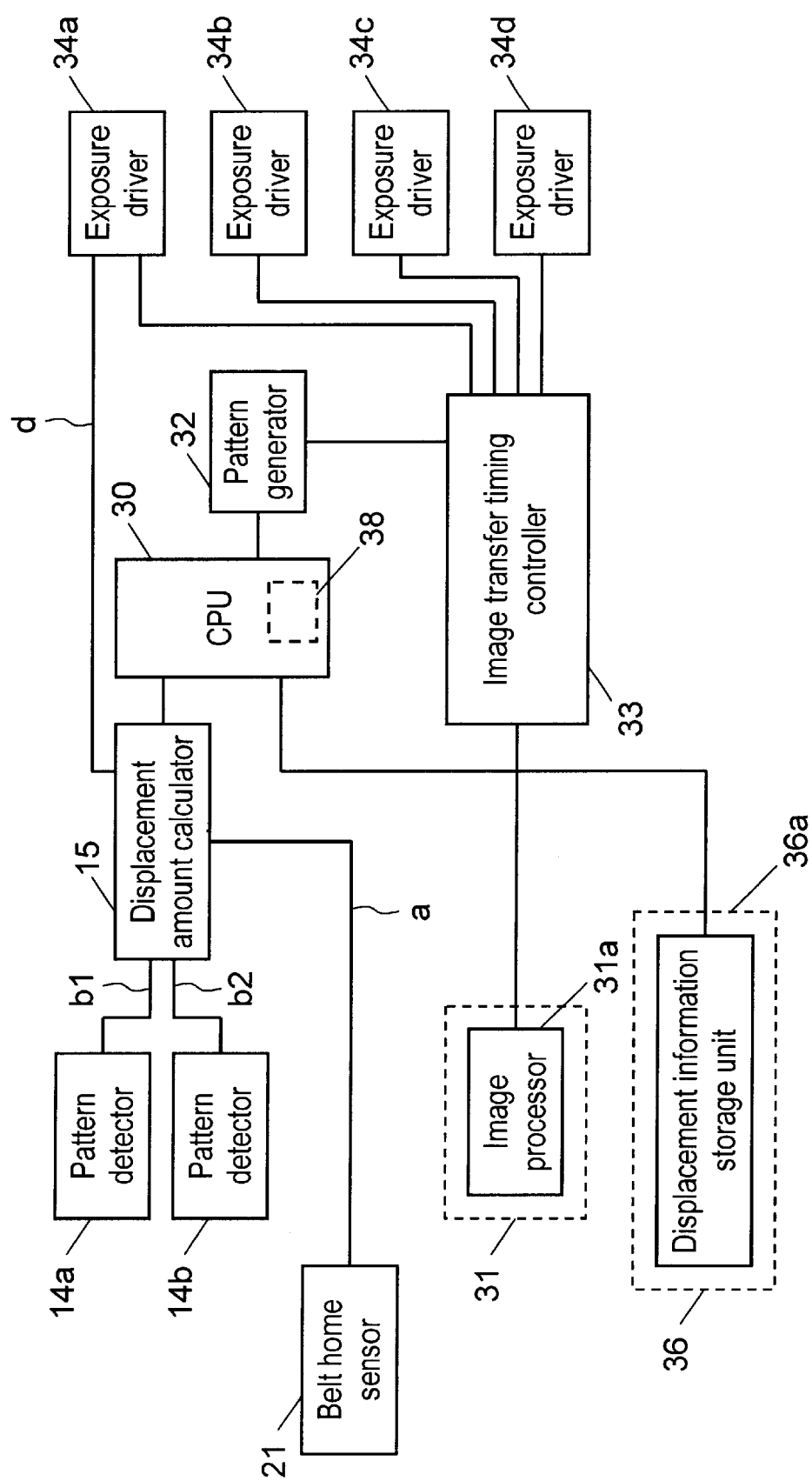
FIG. 21 is a block diagram of the circuit structure of the apparatus of the second preferred embodiment.

In addition to the apparatus having the structure shown in FIG. 11, the apparatus of the embodiment in FIG. 21 includes positional displacement information-storage unit 36. Unit 36 has positional displacement information memory 36a typically made of nonvolatile memory. Memory 36a carries information regarding the relationship between the position of belt 12 and positional displacement due to irregularities in thickness of the belt. Unit 36 uploads the information stored in memory 36a to CPU 30.

In the apparatus having such a structure, CPU 30 starts the initial operation for the apparatus when the power is turned ON. After the initial operation gets started, CPU 30 communicates with the positional displacement information-storage unit 36 to upload the information on the relationship between the position of belt 12 and the positional displacement corresponding to the position into memory ofCPU 30. The method of storing information used in the procedure above is the same as that described in the first preferred embodiment shown in FIG. 16. That is, storage unit 36 stores the relationship between the position of belt 12 and positional displacement corresponding to the position. The correction procedure is therefore performed in the same way as described in the first preferred embodiment.

According to the color-image forming apparatus of the embodiment described above, information regarding the position of belt 12 and the amount of displacement corresponding to the position can be obtained without the help of the reference pattern, since such data has been stored in positional displacement information memory 36a. This fact also contributes to considerable savings in toner consumption.

Third Preferred Embodiment

Figure 22:
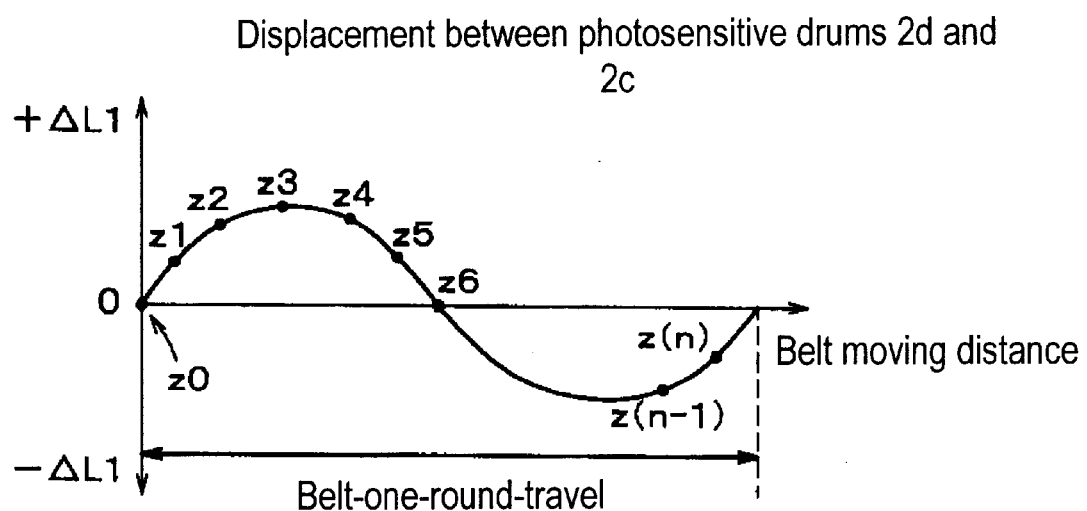
FIG. 22 is a graph indicating displacement between two toner images observed over one cycle of travel of the belt of a color-image forming apparatus of a third preferred embodiment of the present invention.
Figure 23:
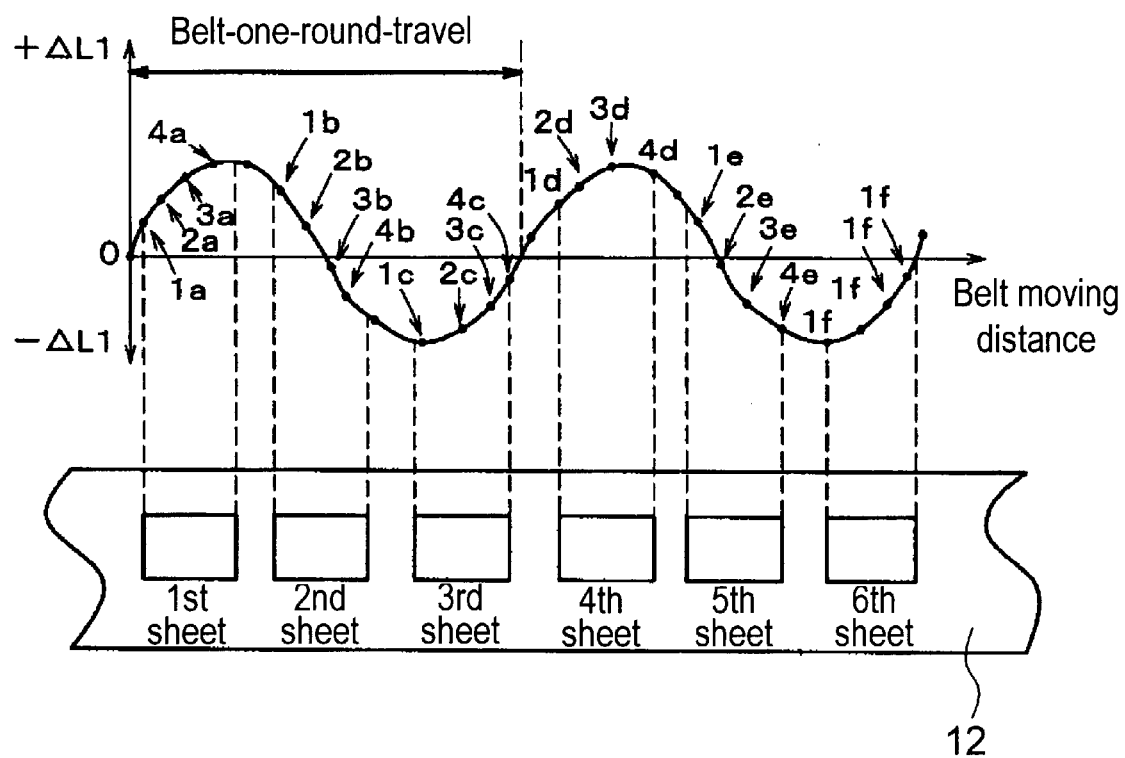
FIG. 23 illustrates the relationship between the position of a sheet put on the belt and the detected displacement in continuous printing in the apparatus of the third preferred embodiment.

FIG. 22 is a graph indicating displacement between two toner images observed over one cycle of travel of the belt of the color-image forming apparatus of the third preferred embodiment of the present invention.

As is apparent from the graph, displacement between drums 2d and 2c varies according to speed variation V1' of belt 12 over one cycle of travel, ranging from −ΔL to +ΔL.

According to the embodiment, one cycle of belt 12 has a length of about 1100 mm, which is the equivalent of about 3 pages of A4-sized cut sheet in continuous printing. When continuous printing is performed with such-sized belt, page-by-page displacement has a different state. These different states are apparent from the equations below, which yield different-valued mean values A, B, C, D, E, and F of page-by-page displacement.

Page 1: $A=(1a+2a+3a+4a)/4$ (19)

Page 2: $B=(1b+2b+3b+4b)/4$

Page 3: $C=(1c+2c+3c+4c)/4$

Page 4: $D=(1d+2d+3d+4d)/4$

Page 5: $E=(1e+2e+3e+4e)/4$

Page 6: $F=(1f+2f+3f+4f)/4$ $A \neq B \neq C \neq D \neq E \neq F$ (20)

As is the case above, a page has a different mean value of displacement from any remaining page, and page-by-page printing needs to have a correction so that the mean value of displacement is a minimum. To realize this, it is necessary to i) collect data about an absolute position of belt 12 and a displacement corresponding to the position prior to the correction; ii) calculate a mean value of displacement, making a prediction about the actually transferred position on belt 12; then iii) provide a correction minimizing the mean value of displacement.

According to the embodiment, belt 12 has a fixed area for printing thereon, and a mean value of displacement in the fixed area is obtained in advance. After that, a correction with respect to the fixed position is performed according to the calculated values.

Figure 24:
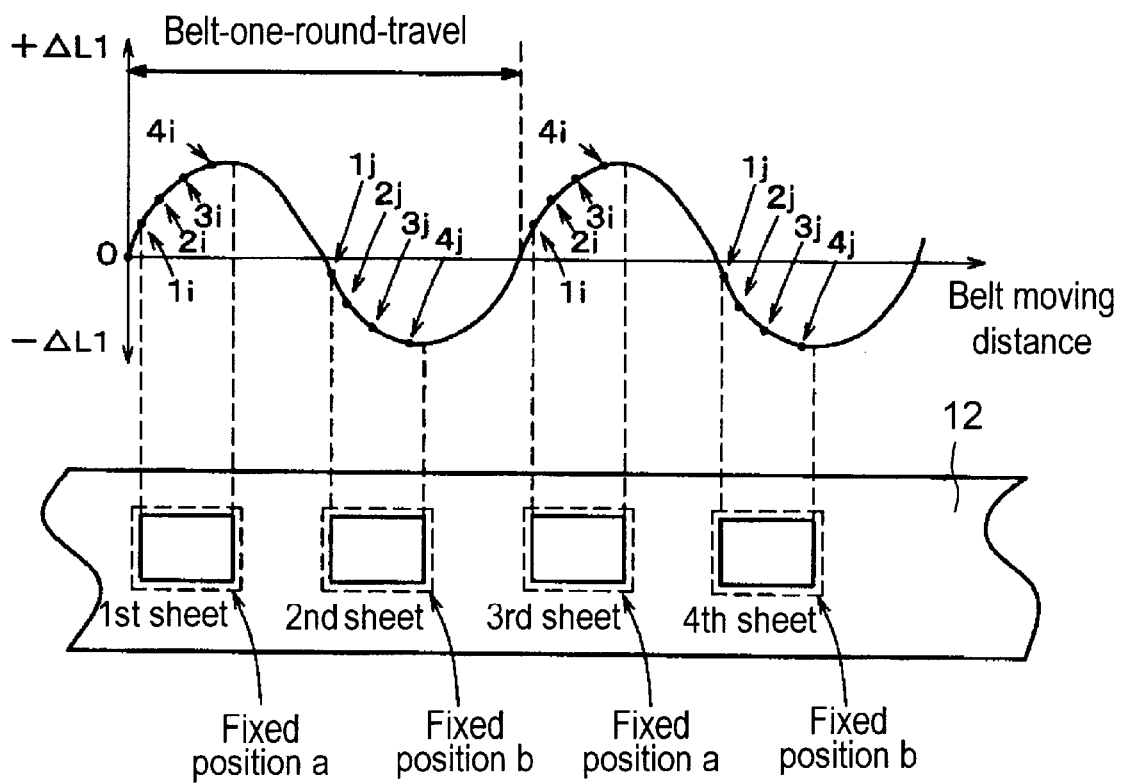
FIG. 24 illustrates the relationship between the position of a sheet put on the belt and the detected displacement when the continuous printing is performed at a fixed position of the belt in the apparatus of the third preferred embodiment.

FIG. 24 illustrates the relationship between the position of a sheet put on the belt and a detected displacement when the continuous printing is performed in a fixed area of the belt in the apparatus of the third preferred embodiment. It is apparent from the figure that displacement in Page 1 is the same amount as that in Page 3 due to having the same transferred position. Similarly, displacement in Page 2 is the same amount as that in Page 4. I and J, mean values of displacement in the fixed areas of Page 1 (3) and Page 2 (4) are given, respectively, by the following equations:

Page 1(3): $I=(1i+2i+3i+4i)/4$ (21)

Page 2(4): $J=(1j+2j+3j+4j)/4$

Figure 25:
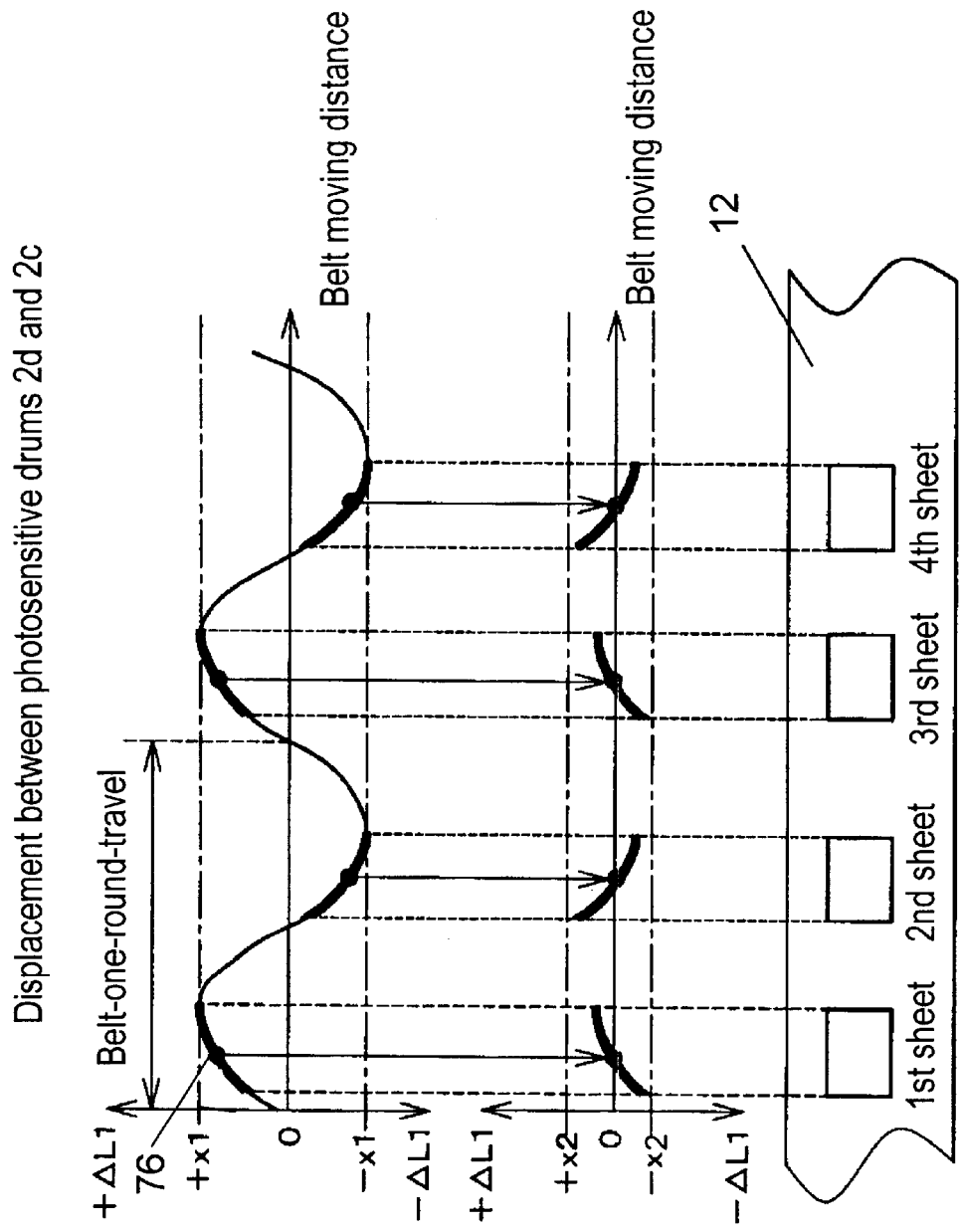
FIG. 25 shows the toner-image forming state in the apparatus of the third preferred embodiment.

FIG. 25 shows the pre- and post-correction state, with cut sheets put in each fixed area on the belt, in continuous printing. In the correction procedure shown in FIG. 25, I and J (mean values of displacement) are corrected so that they are a minimum. For example, mean value 76 of Page 1 is suppressed down to zero. Through the correction, the maximum values of displacement in pre- and post-correction are given by the following expression. It is apparent from it that displacement has been decreased in each area.

$|x1|>|x2|$ (22)

Now will be described the procedures for displacement detection and correction.

Figure 26:
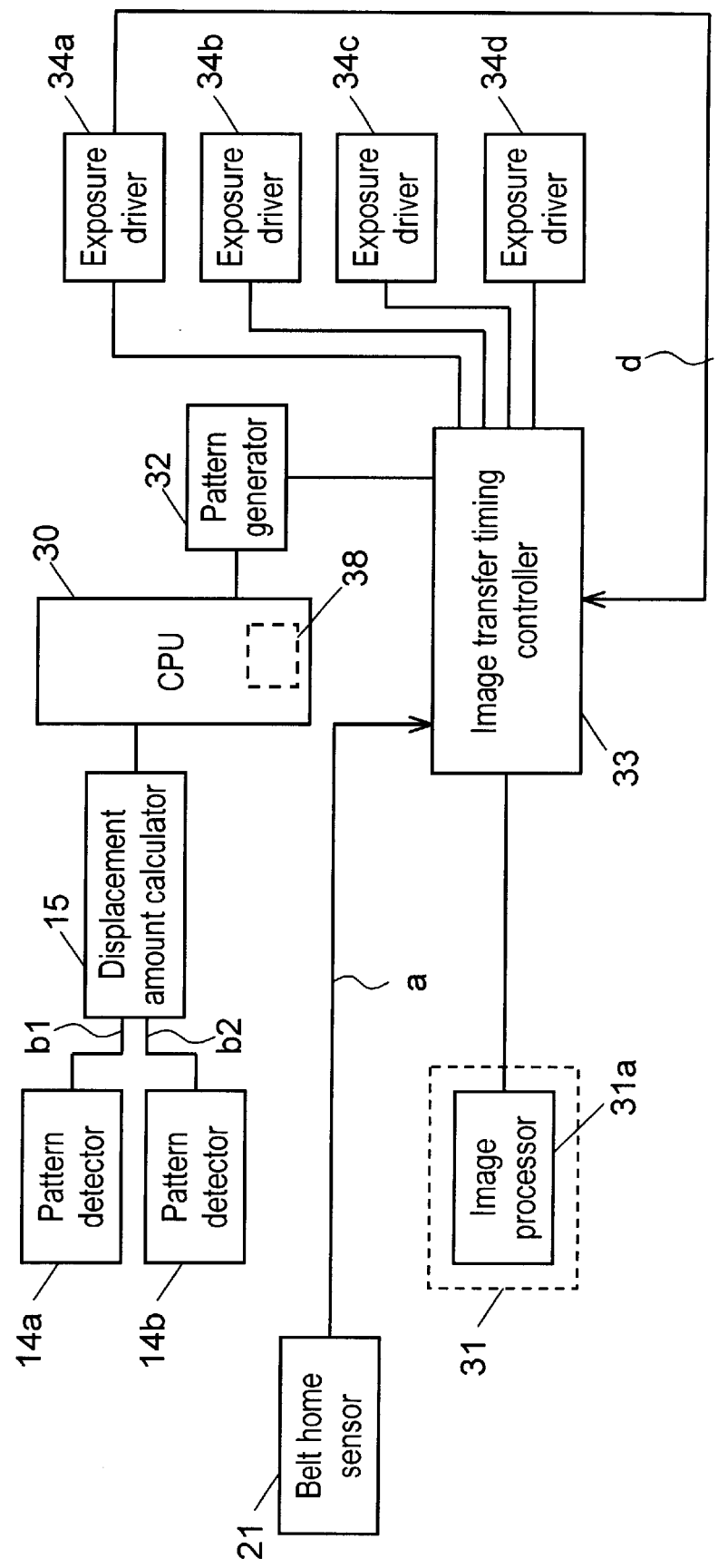
FIG. 26 is a block diagram of the circuit structure of the apparatus of the third preferred embodiment.

According to the color-image forming apparatus of the embodiment shown in FIG. 26, belt home sensor 21 detects the home position of belt 12. Pattern detectors 14a and 14b are disposed at the both sides of belt 12 in the forward direction of the belt. Displacement amount calculator 15 calculates the amount of displacement. Host computer 31 serves as an image processor of a personal computer having image processor 31a. Pattern generator 32 generates the registration reference pattern. Image-transfer timing controller 33 selects image data from image processor 31a and pattern generator 32, and transfers them to exposure units 6a, 6b, 6c, and 6d with a predetermined timing. Exposure driver 34a, 34b, 34c, and 34d drive exposure units 6a, 6b, 6c, and 6d, respectively. CPU 30 is a general controller of the apparatus and also works as the displacement corrector.

In the color-image forming apparatus having the structure described above, CPU 30 starts the initial operation in response to turning the power ON or an operation of the cover of the apparatus.

Following the initial operation of the apparatus, home-position hole 22 in FIG. 12 passes through belt home sensor 21 of belt 12, as the belt travels.

Figure 28:
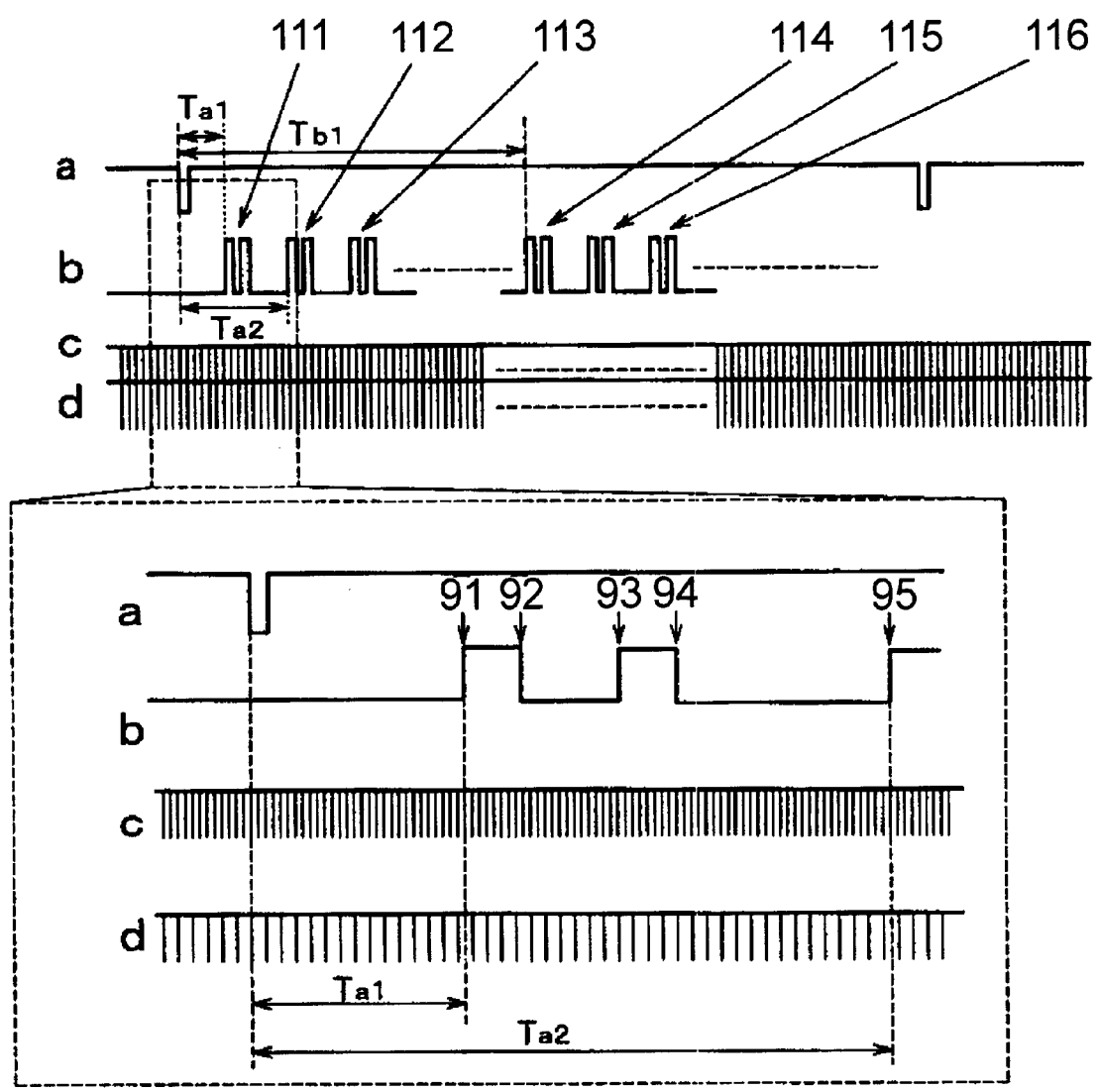
FIG. 28 shows the signal fed into a displacement amount calculator of the apparatus of the third preferred embodiment.

At this moment, signal line 'a' in FIG. 26 has a home signal shown in 'a' of FIG. 28, which is fed into image-transfer timing controller 33. At the same time, timing controller 33 gives a home-signal interrupt to CPU 30.

In response to the interruption, CPU 30 requests that pattern generators 32 start generating reference-pattern data. Pattern generator 32 starts to generate the reference pattern data 1i-k, 1i-c, 1i-k, 1i-m, . . . , controlling the timing of the first-coming reference pattern 1*i-k* so that it is detected by pattern-detector 14 at Ta1-elapsed time after the generating procedure started. Pattern generator 32 generates the reference patterns, according to the further request from CPU 30, in which the reference patterns 1*j-k*, 1*j-c*, 1*j-k*, 1*j-m* should be timed to be detected at Tb1-elapsed time one after another by pattern detector 14.

Image-transfer timing controller 33 receives the reference-pattern data generated in pattern generator 32 one after another, and then transfers the data, at established intervals, to exposure driver 34*a*, 34*b*, 34*c*, and 34*d* corresponding to exposure units 6*a*, 6*b*, 6*c*, and 6*d*, respectively. Driven by the transfer, exposure units 6*a*, 6*b*, 6*c*, and 6*d* provide photosensitive drums 2*a*, 2*b*, 2*c*, and 2*d* with light radiation, respectively, to form four color reference-pattern latent images on drums 2*a*, 2*b*, 2*c*, and 2*d*. Each latent image is developed into a visible toner image by developing units 4*a*, 4*b*, 4*c*, and 4*d*. The visualized toner images are transferred one after another onto belt 12 by transfer units 8*a*, 8*b*, 8*c*, and 8*d*.

Figure 27:
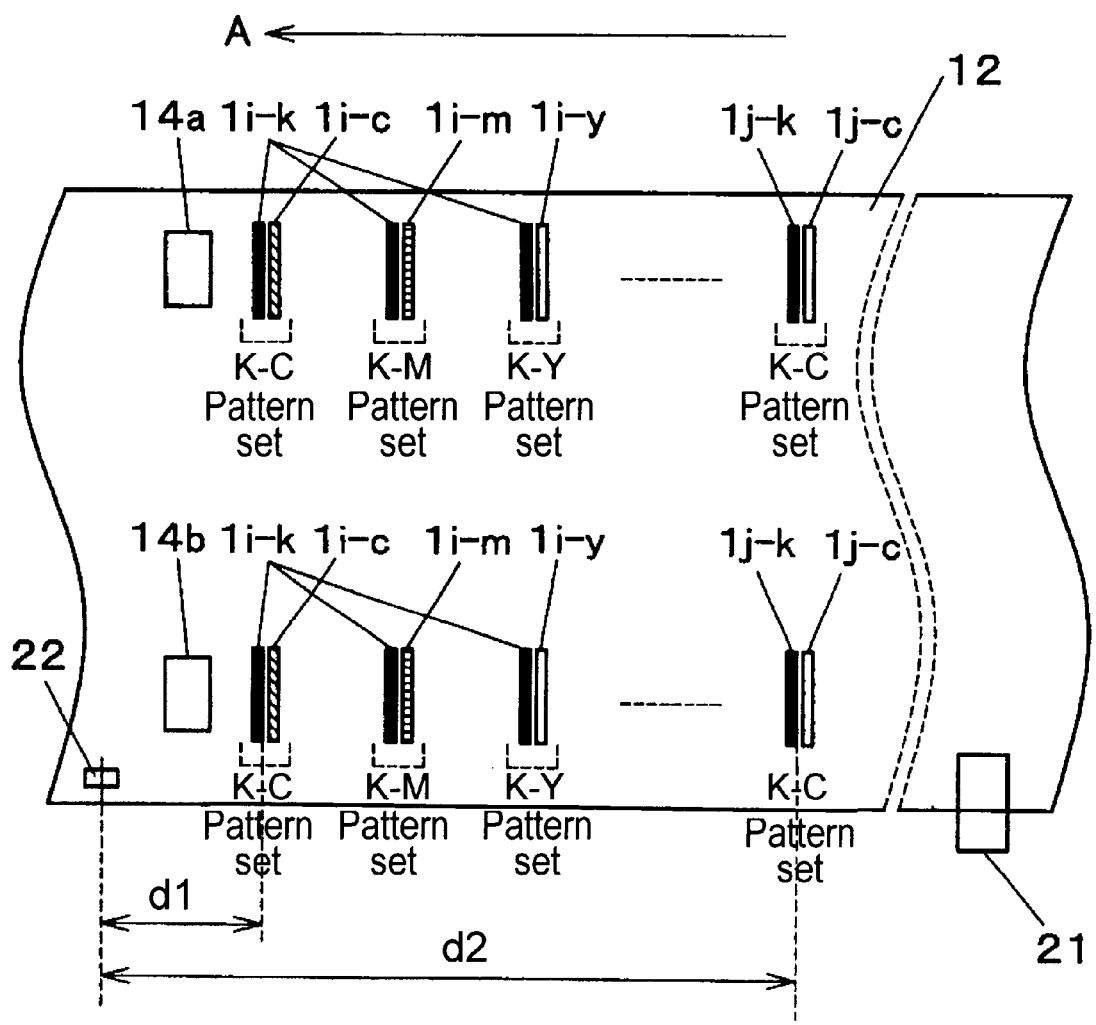
FIG. 27 shows the relationship between the home position of the belt and the position of the home sensor, and the arrangement of the reference pattern formed on the belt of the apparatus of the third preferred embodiment.

Through the procedures above, as shown in FIG. 27, reference patterns 1*i-k*, 1*i-c*, 1*i-m*, etc., are transferred one after another, with the first 1*i-k* pattern spaced away a distance d1 from home-position hole 22. Similarly, reference patterns 1*j-k*, 1*j-c*, 1*j-k*, 1*j-m*, etc., are transferred one after another, with the first 1*j-k* pattern spaced away a distance d2 from home-position hole 22.

When time Ta1 has elapsed since home-position hole 22 of belt 12 was detected by belt home sensor 21, the first reference pattern starts to pass through pattern detectors 14*a* and 14*b*. Signal b carries a reference-pattern signal detected by pattern detectors 14*a* and 14*b*, and FIG. 28 shows the reference-pattern signal. Signal b shown in FIG. 28 corresponds to output signals b1 and b2 from pattern detectors 14*a* and 14*b* in FIG. 26. Signals b1 and b2 are fed into displacement amount calculator 15. Calculator 15 also accepts clock signal c shown in FIG. 28 from the clock generator. Image-transfer timing controller 33 carries horizontal synchronization signal d, which is generated by exposure driver 34*a* responsible for the black (K) component color.

Figure 29:
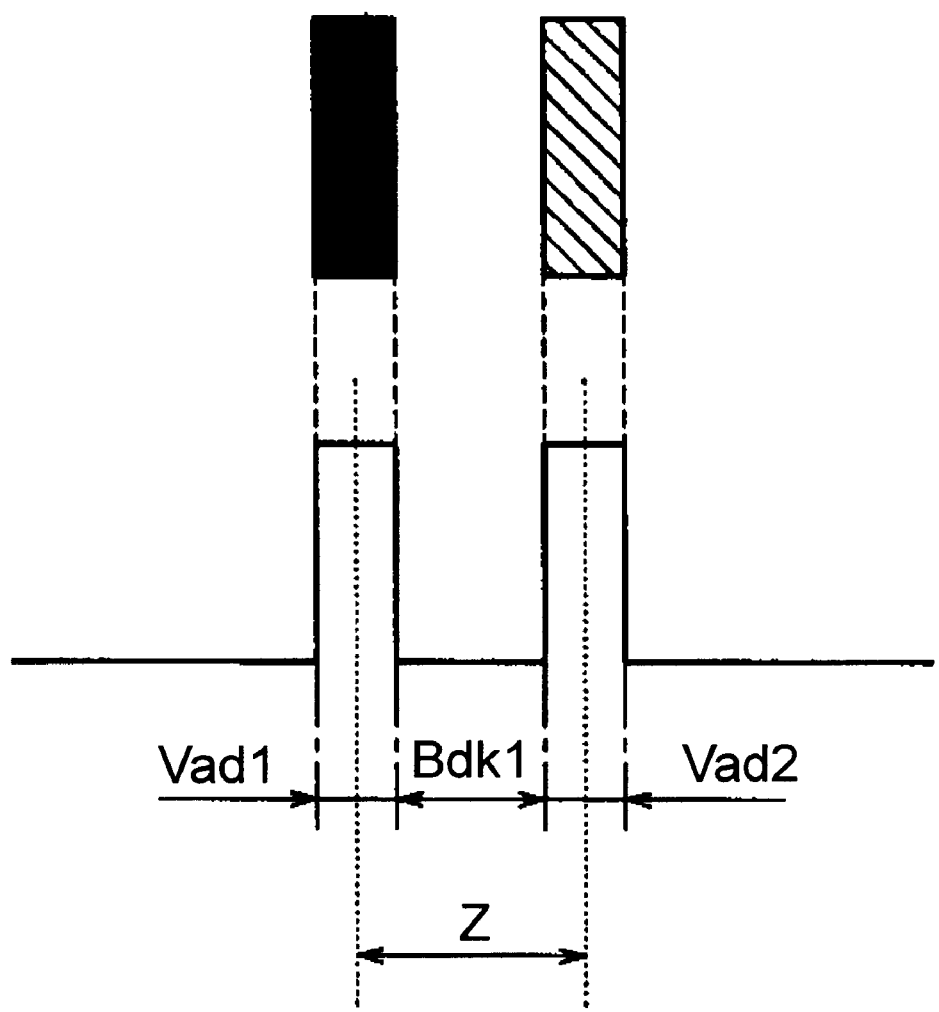
FIG. 29 shows the positional relationship between the reference color and a non-reference color in the apparatus of the third preferred embodiment.
Figure 30:
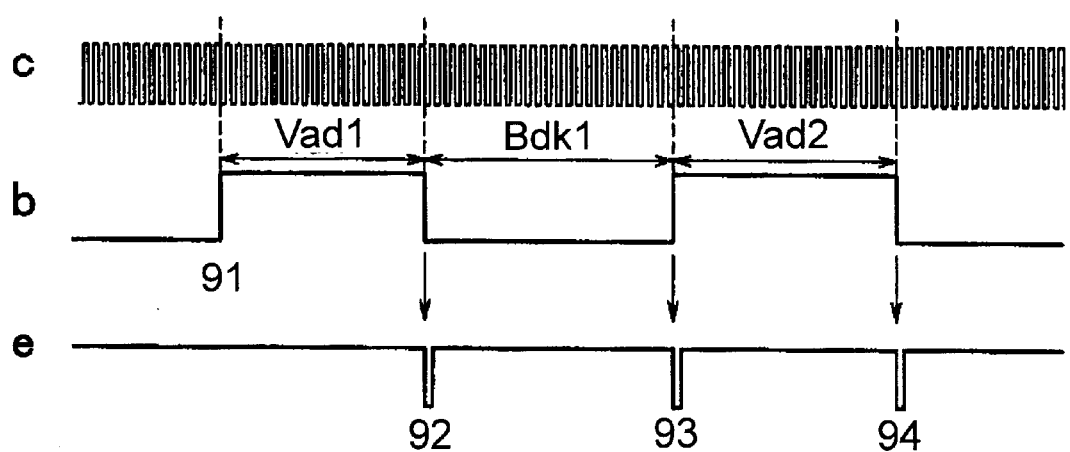
FIG. 30 shows the reference pattern-width count and an interrupt to the CPU in the apparatus of the third preferred embodiment.

Accepting pattern signals b1 and b2, displacement amount calculator 15 calculates by counting the clock signal c, as shown in FIG. 29, pattern widths Vad1 and Vad2, which is the distance between a reference color (in this case, K) and a "neighboring" non-reference color (in this case, C, M, or Y), and pattern interval Bdk1, which is the distance between the reference color and the paired color. After capturing Vad1, Vad2, and Bdk1, CPU 30 calculates the positional displacement Z of a non-reference color with respect to a reference color from the following equation based on captured Vad1, Vad2, and Bdk1, and stores it into its memory.

$$Z=\{(Vad1+Vad2)/2+Bdk1\}-\text{CONST} \quad (23)$$

Where, CONST takes a theoretical value.

With reference to the time chart shown in FIG. 28, a more specific explanation will be given below.

Accepting home signal 'a' of belt 12, image-transfer timing controller 33 resets the counter for signal d, and restarts counting signal d.

When time Ta1 has elapsed since home signal 'a' was accepted, pattern-set 1*i* (K-C) appears on signal lines b1 and b2. Calculator 15 detects the transition point (rising edge 91) of pattern signals b1 and b2, and starts to count the clock signal c to determine the count value of signal d.

After detecting the next transition point (trailing edge 92), calculator 15 completes the counting and sends an interrupt signal e (shown in FIG. 30) to CPU 30. In response to the interrupt signal, CPU 30 captures the first count value Vad1 therein. Meanwhile, calculator 15 has already resumed counting at the occurrence of the interruption. Upon detecting the next transition point (rising edge 93), CPU 30 captures the second count value Bdk1 in response to an interrupt signal from calculator 15. Calculator 15 restarts the next count, and keeps counting until the next transition point (trailing edge 94) is detected. Upon detecting trailing edge 94, CPU 30 captures the third count value Vad2 and completes the capture.

CPU 30 calculates the positional displacement Z of a non-reference color with respect to a reference color from the three captured count values, Vad1, Bdk1, and Vad2, and then stores displacement Z into memory 38.

With these procedures above, CPU 30 completes the calculation of pattern-set 1*i* (K-C) 111 and its storage into memory.

When time Ta2 has elapsed since home signal 'a' was accepted, as shown in FIGS. 27 and 28, calculator 15 detects the first transition point (rising edge 95) of pattern-set 1*i* (K-M) 112. Upon detecting the transition point, calculator 15 starts to count the clock signal c and keeps counting until the next transition point (trailing edge) comes. When the trailing edge is detected, calculator 15 completes the counting, and CPU 30 captures count value Vad1 into its memory.

Like the procedure for capturing pattern-set 1*i* (K-C), CPU 30 captures count values Bdk1, Vad2, and calculates positional displacement Z, and then stores it into its memory 38. In this way, CPU 30 completes the calculation of pattern-set 1*i* (K-M) 112 and its storage into memory.

As is the case with pattern-set 1*i* (K-M), CPU 30 repeats the calculation and capture for pattern-set 1*i* (K-Y) 113, pattern set 2*i*, and so on. After the completion of the process for the last pattern-set, CPU 30 completes the capture of displacement in pattern-sets 1*i*, 2*i*, 3*i*, and 4*i*.

When time Tb1 has elapsed since home signal 'a' was accepted, calculator 15 detects the first transition point of pattern-set 1*j* (K-C) 114. Through a procedure similar to that described above, CPU 30 captures displacement in pattern-sets 1*j*, 2*j*, 3*j*, and 4*j* to complete the capture of all of the pattern-sets. FIG. 31 shows displacements Z in the C-, M-, and Y-toner image with respect to the K-toner image, which are stored in the memory of CPU 30.

After the completion of the entire detection process, CPU 30 stops all of the driving systems to complete the initial operation.

Now will be described the printing procedures.

In response to the request for preparation of printing from host computer 31 in the apparatus, CPU 30 requests that the driving system for four image-forming stations 1*a*, 1*b*, 1*c*, and 1*d*, and the driving system for belt 12 and fixing unit 20 start driving the four stations, belt 12, and fixing unit 20 to be ready for operations. At the same time, CPU 30 provides the high-voltage generator (not shown) with the instruction so that four image-forming stations 1*a*, 1*b*, 1*c*, and 1*d* get ready for image-forming procedures.

When belt 12 has a stable travel, and fixing unit 20 has an optimal temperature for printing, CPU 30 sends back a "printing-ready" signal to host computer 31 in the apparatus. Receiving the signal, host computer 31 requests that CPU 30 start printing.

Figure 32:
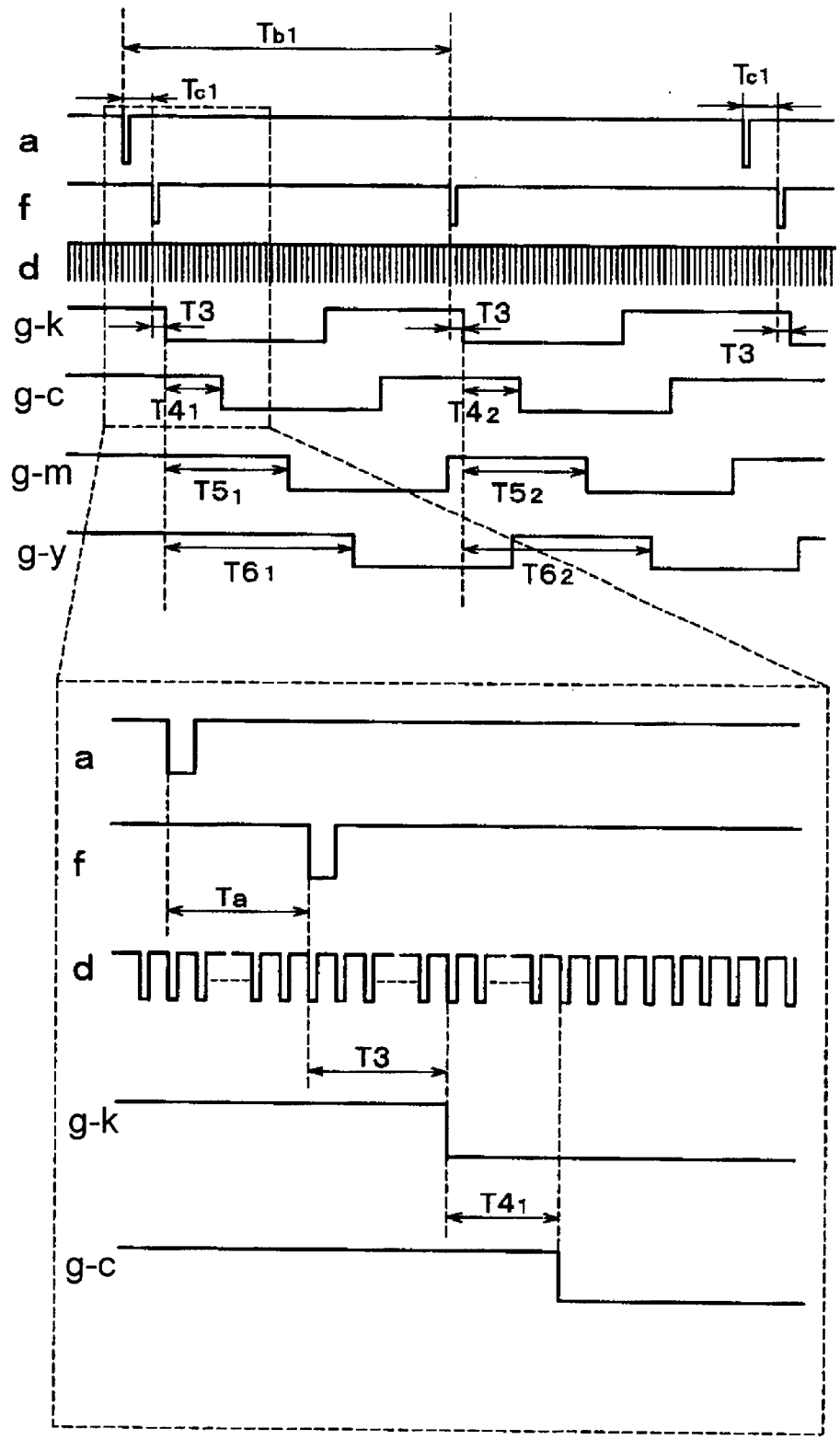
FIG. 32 shows changes in a vertical synchronization signal in the correcting step in the apparatus of the third preferred embodiment.

After detecting home signal 'a' of belt 12, as shown in FIG. 32, CPU 30 outputs printing-start signal f to image-transfer timing controller 33. Accepting the signal, controller 33 sends image processor 31*a* vertical synchronization signals g-k, g-c, g-m, and g-y, each of them being generated after time T3, T4, T5, and T6 has elapsed since the moment at which printing-start signal f occurred, respectively. Controller 33 also outputs horizontal synchronization signal d and clock signal c. When vertical synchronization signals g-k, g-c, g-m, and g-y are active, image processor 31 outputs K-, C-, M-, and Y-image signals synchronized with the horizontal synchronization signal and the clock signal. Image-transfer timing controller 33 transfers the image signals for K, C, M, and Y to exposure drivers 34a, 34b, 34c, and 34d, respectively. Following the transfer, exposure units 6a, 6b, 6c, and 6d provide image-forming stations 1a, 1b, 1c, and 1d with laser radiation, respectively, for image-forming.

Here will be described in detail the timing control from the output of printing-start signal f that is determined as a starting point until vertical synchronization signals g-k, g-c, g-m, and g-y are turned ON (active) at intervals over time.

The timing control of vertical synchronization signals g-k, g-c, g-m, and g-y by timing controller 33 is synchronized with signal d. More specifically, each time T3, T4, T5, and T6 described earlier takes multiples of the time required for one cycle of signal d. The ON-timing of vertical synchronization signals g-k, g-c, g-m, and g-y is determined as follows: signal g-k goes active after time T3 has elapsed since printing-start signal f occurred; signal g-c goes active after time T4 has elapsed since the moment at which signal g-k is turned ON; and signals g-m and g-y go active after time T5, T6 has elapsed since the moment at which signal g-k turned ON, respectively. Before outputting signal f to image-transfer timing controller 33, CPU 30 calculates each length of T3, T4, T5, T6 and sets them in the register in timing controller 33.

Now will be described the calculations of T3, T4, T5, and T6.

It is necessary to print the images in the area nearly the same as areas i and j in which the reference patterns are transferred on belt 12 in reference-pattern detecting. As described earlier, Ta1 represents the time required until pattern detector 14 detects the first reference pattern 1i–k since home sensor 13 was detected. Now assume that Tdb represents the time required until pattern detector 14 detects the first reference pattern 1i–k since image-forming station 1d started to expose reference pattern 1i–k. Then, the time T from detecting home sensor 13 to exposure-starting by exposure unit 6d is given by the following equation:

$$T=Ta1-Tdb \quad (24)$$

If Tc1 represents the time required for CPU 30 to output a printing-start signal f from detecting home sensor 13, T3 is obtained from the equation below:

$$T3=T-Tc1=Ta1-Tdb-Tc1 \quad (25)$$

T4, T5, and T6 are derived from the calculations below, taking the arrangement of drums 2a, 2b, 2c, and 2e into account.

$$T4=L/1 \quad (26)$$

$$T5=L/1\times 2$$

$$T6=L/1\times 3$$

Where, L indicates the distance between drums 2a and 2b (2b and 2c, or 2c and 2d), the value 1 means the scanning width for one line with respect to the horizontal synchronization signal.

If there is no displacement between K-Y, K-M, and K-C pattern sets, the printing operation having the setting above provides a successfully overlapped toner image on belt 12. Otherwise, the following correction will be required.

T3 indicates the exposure timing for the K-toner image. T3 has a fixed value because it is used as the reference for displacement measurements. Suppose that vertical synchronization signal g-c is outputted with a timing of T4 as a default. In this case, displacement between the C-toner image and the K-toner image, which is expected when the C-toner image reaches the tangent made belt 12 and drum 2d, can be determined from the positional displacement of the C-toner image with respect to the K-toner image pre-stored in the memory of CPU 30. FIG. 31 shows that positional displacements between the K- and C-toner images at 1i position is represented by Z1i (K-C).

Figure 33:
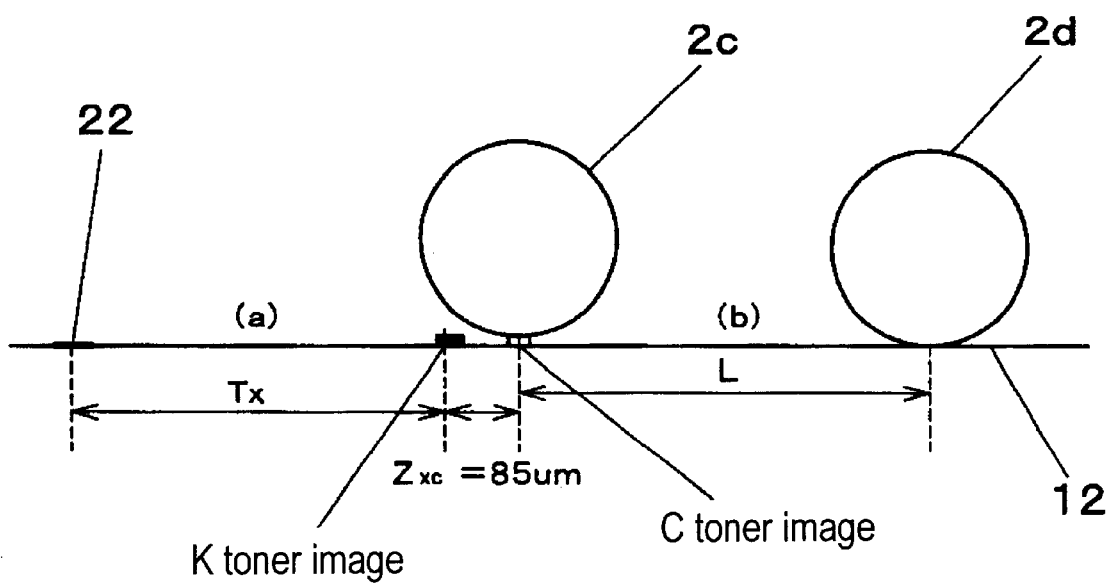
FIG. 33 shows the positional relationship between two photosensitive drums and two toner images formed on the belt in the apparatus of the third preferred embodiment.
Figure 35:
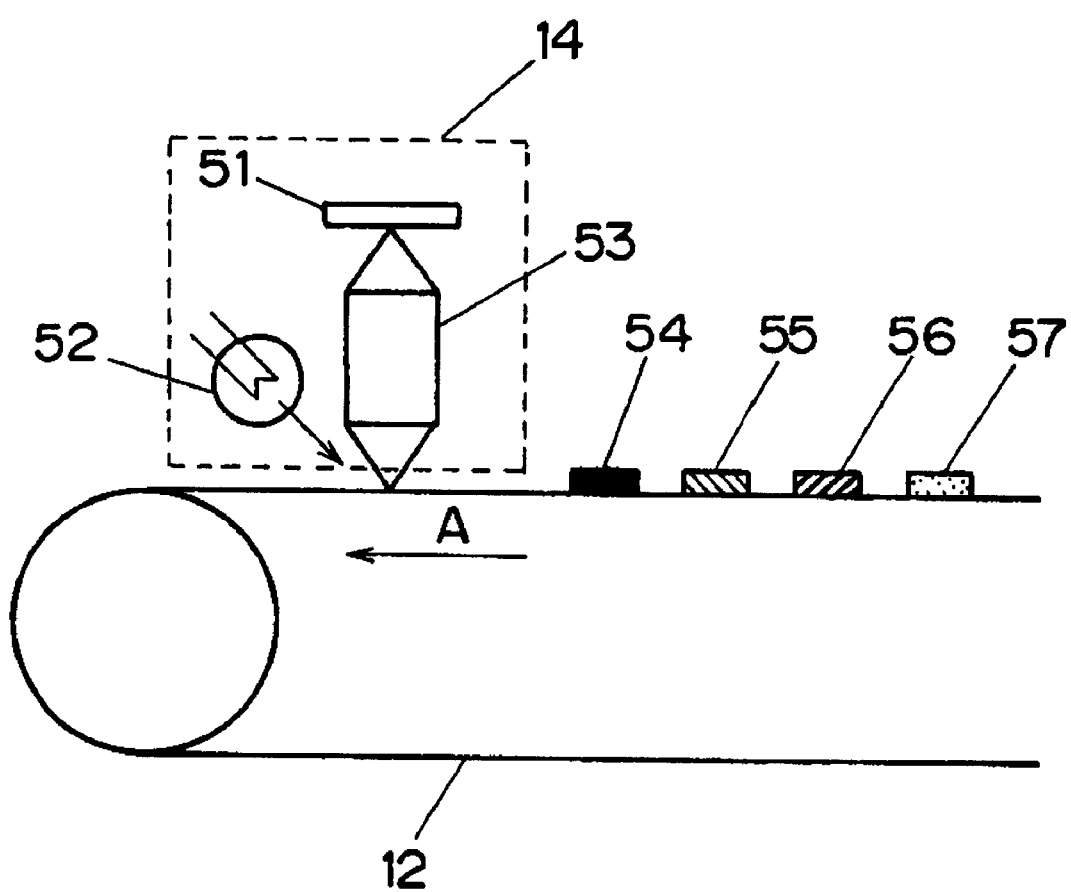
FIG. 35 shows the structure of the pattern detector of the conventional color-image forming apparatus.
Figure 36:
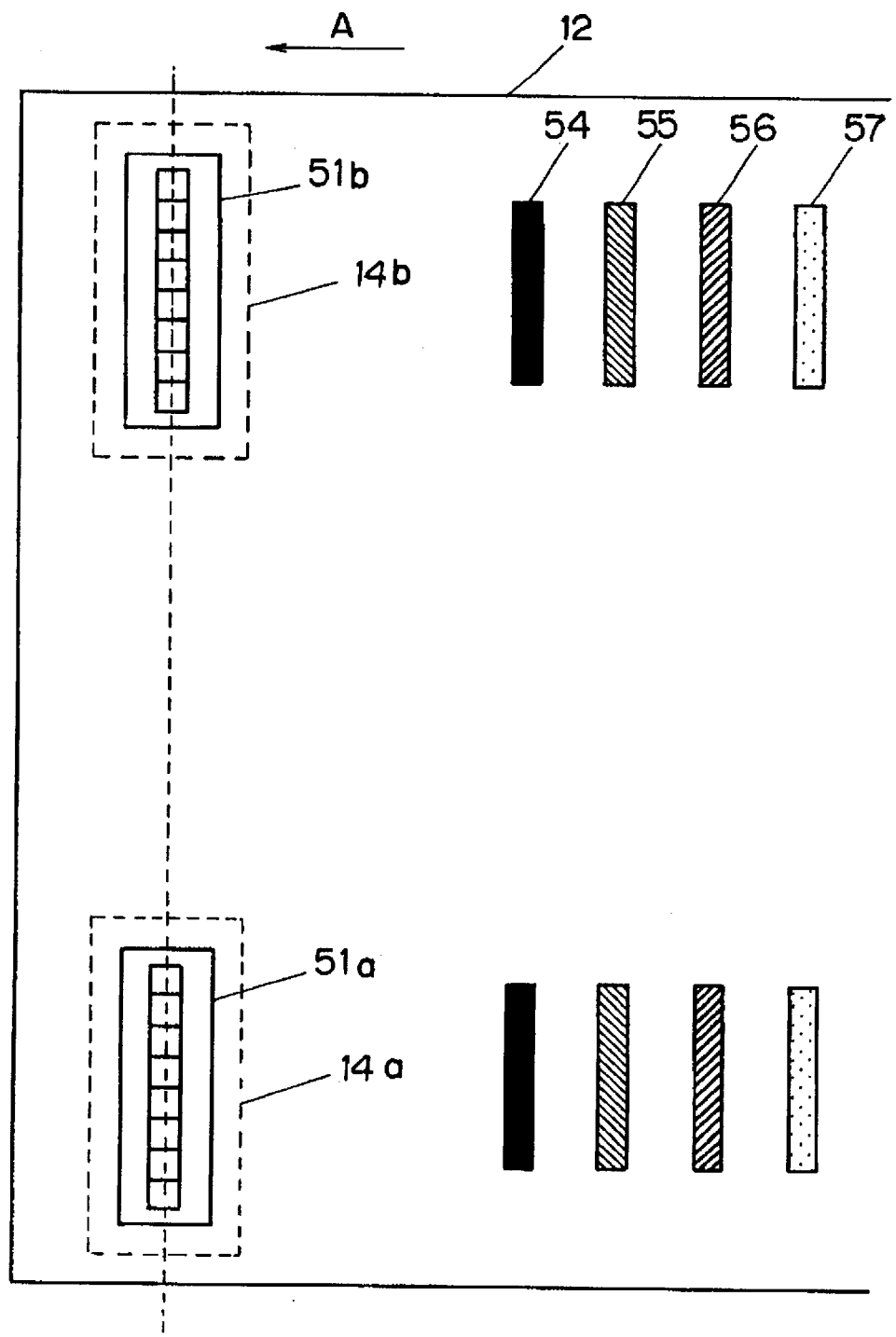
FIG. 36 shows the layout of the reference pattern on the belt and the pattern detector of the conventional apparatus.
Figure 38:
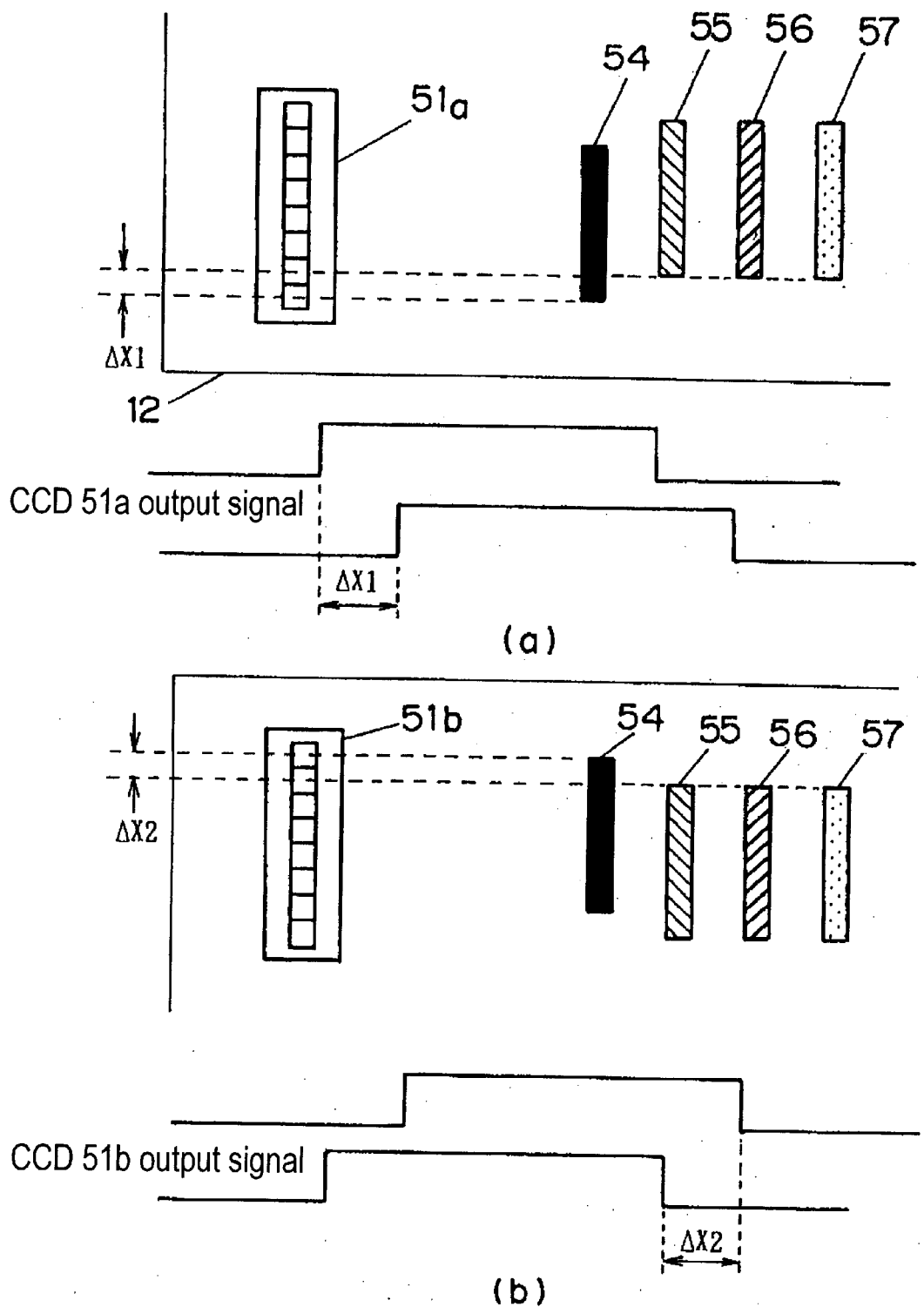

FIG. 33 shows the positional relationship between the K- and C-toner images when Z1i (K-C) is equal to +85 µm. As is apparent from FIG. 33, when the C-toner image is transferred to belt 12 at the position of the tangent made by belt 12 and drum 2d, the K-toner image is located 85 µm ahead. In addition, displacements measured at positions 2i, 3i, and 4i are Z2i (K-C), Z3i (K-C), and Z4i (K-C), respectively, which are different from displacement at position 1i.

The mean values of four displacements between the K- and the C-toner image in the first printing range—displacements measured at positions 1i, 2i, 3i, and 4i are given by the following equation:

$$Zi1\sim 4(K\text{-}C)\text{ave}=(Z1i(K\text{-}C)+Z2i(K\text{-}C)+Z3i(K\text{-}C)+Z4i(K\text{-}C))/4 \quad (27)$$

Now suppose that Z1i~4(K-C) ave is equal to +150 µm. This means the K-toner image lies +150 µm ahead with respect to the position of the C-toner image all around the printing range.

Therefore, in order to generally match the position of the K-toner image with the C-toner image, it is necessary to control the printing-start timing of the C-toner image to be +150 µm shorter than time T4.

Suppose that the apparatus has a vertical resolution of 600 dot/inch (dpi). In this case, one line of the horizontal synchronization signal has a width of 42.3 µm. From the equation below, the length of 150 µm corresponds to about 4 lines on the 600 dpi-resolution basis, so that displacement in this case should be corrected by 4 dots.

$$4\approx 150/42.3 \quad (28)$$

(where, one line: 600 dpi)

Therefore, value T41 correcting T4 is obtained by subtracting 4 lines from default value T4, as shown Eq. (29) below:

$$T41=T4-4 \quad (29)$$

In a like manner, CPU 30 calculates the mean values of displacement between the K- and M-toner images—Zi1~4 (K-M)ave, and between the K- and Y-toner images—Zi1~4 (K-Y)ave, to obtain correction values T51 and T61, respectively. CPU 30 sets calculated values T41, T51, T61 for the register in image-transfer timing controller 33. After that, CPU 30 outputs printing-start signal f to timing controller 33.

In response to the signal, controller 33 transmits to image processor 31 vertical synchronization signals g-k, g-c, g-m, and g-y after T3, T41, T51, and T61 have elapsed, respectively. CPU 30 also calculates correction values for displacement in the second printing range. The mean values of four displacements between the K- and the C-toner image in the second printing range—displacements measured at positions 1j, 2j, 3j, and 4j are given by the following equation:

$$Zj1\sim4(K\text{-}C)\text{ave}=(Z1j(K\text{-}C)+Z2j(K\text{-}C)+Z3j(K\text{-}C)+Z4j(K\text{-}C))/4 \quad (30)$$

Now suppose that Zj1~4(K-C)ave is equal to −120 µm. This means the C-toner image lies 120 µm ahead with respect to the position of the K-toner image all around the printing range.

Therefore, in order to generally match the position of the K-toner image with the image, it is necessary to control the printing-start timing of the C-toner image to be +120 µm longer than time T4. The length of 120 µm corresponds to 3 dots on the 600 dpi-resolution basis. Time T42 for correcting T4, which is extended by the length of time corresponding to 3 dots, is given by the equation:

$$T42=T4+3 \quad (31)$$

In a like manner, CPU 30 calculates the mean values of displacement between the K- and M-toner images −Zj1~4 (K-M)ave, and between the K- and Y-toner images −Zj1~4 (K-Y) ave, to obtain correction values T52 and T62, respectively.

When the count value of horizontal synchronization signal d reaches Tb1, CPU 30 sets calculated values T42, T52, T62, and T3 into register in image-transfer timing controller 33. After that, CPU 30 outputs printing-start signal f to timing controller 33. In response to the signal, controller 33 transmits to image processor 31 vertical synchronization signals g-k, g-c, g-m, and g-y after T3, T42, T52, and T62 have elapsed, respectively According to the color-image forming apparatus of the embodiment, as described above, the mean values of displacement in a predetermined printing range are controlled to be a minimum. It is therefore possible to decrease displacement in the toner images due to irregularities in thickness of belt 12, providing greatly improved image forming with high quality.

What is claimed is:

1. A color-image forming apparatus comprising:
   a) a plurality of image-forming stations, each of said image-forming stations including a photosensitive body for carrying a latent image thereon and including a developing unit for developing the latent image into a visible toner image, each of said image-forming stations being operable to form a corresponding-color toner image;
   b) an exposure unit for providing said photosensitive body of each of said image-forming stations with light radiation to form the latent image thereon;
   c) an inter-stage transfer belt on which the toner image formed by each of said image-forming stations is to be transferred one after another so as to obtain an overlapped toner image;
   d) a pattern detector for detecting a displacement in the transferred toner images on said transfer belt based on a registration reference pattern, the reference pattern being formed by each of said image-forming stations and then transferred one after another onto said transfer belt; and
   e) a displacement corrector for controlling an interval of image-forming data signals sent from an image processor to said exposure unit according to the displacement detected by said pattern detector, said displacement corrector being operable to control the interval of the image-forming data signals on a dot-by-dot basis with respect to a resolution of said color-image forming apparatus.

2. The color-image forming apparatus of claim 1, wherein said pattern detector is operable to detect the displacement based on a reference pattern formed of a pattern set spaced apart at a predetermined interval, and the pattern set is formed of a combination of a plurality of color patterns.

3. The color-image forming apparatus of claim 1, wherein said pattern detector is operable to detect the displacement based on a reference pattern formed of a pattern set spaced apart at a predetermined interval, and the pattern set is formed of a pair of color patterns including a reference color pattern and a color pattern spaced apart at another predetermined interval.

4. The color-image forming apparatus of claim 1, wherein said displacement corrector is operable to control the interval of image-forming data signals so that displacement in the transferred toner images on said transfer belt formed by each of said image-forming stations is substantially minimized.

5. The color-image forming apparatus of claim 1, wherein said image-forming stations are each operable to transfer a reference pattern one after another onto said transfer belt spaced apart at a predetermined interval over one cycle of travel of said transfer belt.

6. The color-image forming apparatus of claim 1, further comprising:
   f) a displacement information storage unit for storing information on a relationship between a position of said transfer belt along one cycle of travel and corresponding displacement based on the displacement detected by said pattern detector,
   wherein the reference pattern is transferred one after another onto said transfer belt spaced apart at a predetermined interval over one cycle of travel of said transfer belt, and said displacement corrector is operable to control the interval of image-forming data signals based on the information stored in said displacement information storage unit so that displacement in toner images on said transfer belt formed by each of said image-forming stations is substantially minimized.

7. The color-image forming apparatus of claim 1, further comprising:
   f) a displacement amount calculator for calculating a mean value of displacement in the reference pattern transferred in a printing range for a cut sheet put on said transfer belt based on the displacement detected by said pattern detector,
   wherein the reference pattern is transferred one after another onto said transfer belt spaced apart at a predetermined interval over one cycle of travel of said transfer belt, and said displacement corrector is operable to control the interval of image-forming data signals sent to the exposure unit so that displacement in toner images formed on said transfer belt by each of said image-forming stations is substantially minimized, based on the mean value of displacement calculated by said displacement amount calculator.

8. The color-image forming apparatus of claim 1, further comprising:
   f) a displacement information storage unit for storing information on a relationship between a position of said transfer belt along one cycle of travel and corresponding displacement; and
   g) a displacement amount calculator for calculating a mean value of displacement in the reference pattern transferred in a printing range for a cut sheet put on said transfer belt based on the information stored in said displacement information storage unit,
   wherein the reference pattern is transferred one after another onto said transfer belt spaced apart at a predetermined interval over once cycle of travel of said transfer belt, and said displacement corrector is operable to control the interval of image-forming data signals sent to said exposure unit so that displacement in toner images formed on said transfer belt by each of said image-forming stations substantially minimized, based on the mean value of displacement.

9. The color-image forming apparatus of claim 7, wherein said displacement amount calculator is operable to calculate the mean value of displacement until a print operation starts after a print request is received, or until a subsequent print operation starts after the print operation is completed.

10. A color-image forming apparatus comprising:
   a) a plurality of image-forming stations, each of said image-forming stations including a photosensitive body for carrying a latent image thereon and including a developing unit for developing the latent image into a visible toner image, each of said image-forming stations being operable to form a corresponding-color toner image;
   b) an exposure unit for providing said photosensitive body of each of said image-forming stations with light radiation to form the latent image thereon;
   c) an inter-stage transfer belt on which the toner image formed by each of said image-forming stations is to be transferred one after another so as to obtain an overlapped toner image;
   d) a displacement information storage unit for storing information on a relationship between a position of said transfer belt along one cycle of travel and corresponding displacement; and
   e) a displacement corrector for controlling an interval of image-forming data signals sent from an image processor to said exposure unit so that displacement in toner images on said transfer belt formed by each of said image-forming stations is substantially minimized, based on the information stored in said displacement information storage unit, said displacement corrector being operable to control the interval of the image-forming data signals on a dot-by-dot basis with respect to a resolution of said color-image forming apparatus.

11. The color-image forming apparatus of claim 1 further comprising:
   f) a displacement amount calculator for calculating a mean value of displacement according to the displacement detected by said pattern detector,
   wherein the reference pattern is transferred one after another onto said transfer belt spaced apart at a predetermined interval over one cycle of travel of said transfer belt, and said displacement corrector is operable to control the interval of image-forming data signals sent to said exposure unit so that displacement on said transfer belt is substantially minimized, based on the mean value of displacement calculated based on the displacement detected by said pattern detector.

12. The color-image forming apparatus of claim 1 further comprising:
   f) a displacement information storage unit for storing information on a relationship between a position of said transfer belt along one cycle of travel and corresponding displacement; and
   g) a displacement amount calculator for calculating a mean value of displacement in the reference pattern transferred in a printing range for a cut sheet put on said transfer belt based on the information stored in said displacement information storage unit,
   wherein each of the toner images has an individual color and is formed by one of said image-forming stations, said image-forming stations being operable to transfer each of the toner images one after another onto said transfer belt to obtain an overlapped image in such a way that a cut sheet put on said transfer belt has a transferred range located at substantially the same position of said transfer belt as that for remaining cut sheets, and said image-forming stations are operable to transfer each reference pattern one after another onto said transfer belt spaced apart at a predetermined interval over one cycle of travel of said transfer belt, and said displacement corrector is operable to control the interval of image-forming data signals sent to said exposure unit so that displacement in toner images on said transfer belt formed by each of said image-forming stations is substantially minimized, based on the mean value of displacement.

13. The color-image forming apparatus of claim 2, wherein said image-forming stations are each operable to transfer a reference pattern one after another onto said transfer belt spaced apart at a predetermined interval over one cycle of travel of said transfer belt.

14. The color-image forming apparatus of claim 8, wherein said displacement amount calculator is operable to calculate the mean value of displacement until a print operation starts after a print request is received, or until a subsequent print operation starts after the print operation is completed.

* * * * *